United States Patent
Koumoto et al.

(10) Patent No.: US 10,514,183 B2
(45) Date of Patent: Dec. 24, 2019

(54) EXHAUST GAS LATENT HEAT RECOVERY DEVICE

(71) Applicant: MITSUBISHI HITACHI POWER SYSTEMS, LTD., Kanagawa (JP)

(72) Inventors: Naoki Koumoto, Tokyo (JP); Tomohiro Harada, Tokyo (JP); Hiroyuki Yagita, Kanagawa (JP); Akitoshi Sugiyama, Kanagawa (JP); Tarou Ichihara, Kanagawa (JP); Kimio Konno, Kanagawa (JP); Yukimitsu Sasaki, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/576,498

(22) PCT Filed: Jul. 15, 2016

(86) PCT No.: PCT/JP2016/071032
§ 371 (c)(1),
(2) Date: Nov. 22, 2017

(87) PCT Pub. No.: WO2017/018253
PCT Pub. Date: Feb. 2, 2017

(65) Prior Publication Data
US 2018/0149388 A1 May 31, 2018

(30) Foreign Application Priority Data
Jul. 29, 2015 (JP) .................................. 2015-149701

(51) Int. Cl.
*F24H 8/00* (2006.01)
*F22D 1/06* (2006.01)
(Continued)

(52) U.S. Cl.
CPC .............. *F24H 8/006* (2013.01); *F22D 1/06* (2013.01); *F22D 1/12* (2013.01); *F22D 1/32* (2013.01);
(Continued)

(58) Field of Classification Search
CPC ........................................................ F24H 8/006
See application file for complete search history.

(56) References Cited

U.S. PATENT DOCUMENTS 4,073,267 A * 2/1978 Hunt .................... F22B 1/1823
122/32
4,173,949 A * 11/1979 Roethe ..................... F22D 1/12
122/1 C
(Continued)

FOREIGN PATENT DOCUMENTS

JP 2012/7818 1/2012
JP 2012-57860 3/2012
(Continued)

OTHER PUBLICATIONS

International Search Report dated Sep. 13, 2016 in International Application No. PCT/JP2016/071032.
(Continued)

*Primary Examiner* — Nathaniel Herzfeld
(74) *Attorney, Agent, or Firm* — Wenderoth, Lind & Ponack, L.L.P.

(57) ABSTRACT

An exhaust gas latent-heat recovery device includes: a heat transfer tube disposed inside a duct through which exhaust gas flows, the heat transfer tube having a water supply inlet into which water to be heated for recovering latent heat of the exhaust gas is supplied and a water supply outlet through which the water to be heated is discharged; and a water supply control part configured to control supply of the water to be heated to the water supply inlet. The water supply
(Continued)

control part is configured to control supply of the water to be heated from the water supply inlet so that an outlet temperature being a temperature of the water to be heated at the water supply outlet is at a set temperature.

11 Claims, 8 Drawing Sheets

(51) Int. Cl.
    *F22D 1/32*     (2006.01)
    *F22D 1/12*     (2006.01)
    *F28F 27/02*     (2006.01)
    *F28D 1/053*     (2006.01)
    *F28D 21/00*     (2006.01)
    *F28D 1/047*     (2006.01)

(52) U.S. Cl.
    CPC ..... *F28D 1/05341* (2013.01); *F28D 21/0007* (2013.01); *F28F 27/02* (2013.01); *F28D 1/0477* (2013.01); *Y02B 30/106* (2013.01)

(56) References Cited

U.S. PATENT DOCUMENTS

| | | | | |
|---|---|---|---|---|
| 4,776,391 A | * | 10/1988 | Warner | B01D 53/002 165/111 |
| 5,440,871 A | * | 8/1995 | Dietz | F01K 21/047 122/4 D |
| 5,567,215 A | * | 10/1996 | Bielawski | B01D 53/504 165/913 |
| 2002/0079374 A1 | * | 6/2002 | DeSellem | F22B 37/008 236/16 |
| 2012/0324893 A1 | | 12/2012 | Hayashi | |
| 2013/0047903 A1 | * | 2/2013 | Nochi | F23J 15/02 110/345 |
| 2013/0098104 A1 | * | 4/2013 | Hman | B01D 5/0012 62/617 |
| 2013/0125841 A1 | | 5/2013 | Ichihara et al. | |

FOREIGN PATENT DOCUMENTS

| | | |
|---|---|---|
| JP | 2014-169693 | 9/2014 |
| JP | 2014-206374 | 10/2014 |
| WO | 2011/111450 | 9/2011 |

OTHER PUBLICATIONS

International Preliminary Report on Patentability dated Feb. 8, 2018 in International Application No. PCT/JP2016/071032, with English translation.

Notification of Result of Substantive Examination dated Aug. 27, 2019 in Indonesian Patent Application No. PID201708294, with English translation.

\* cited by examiner

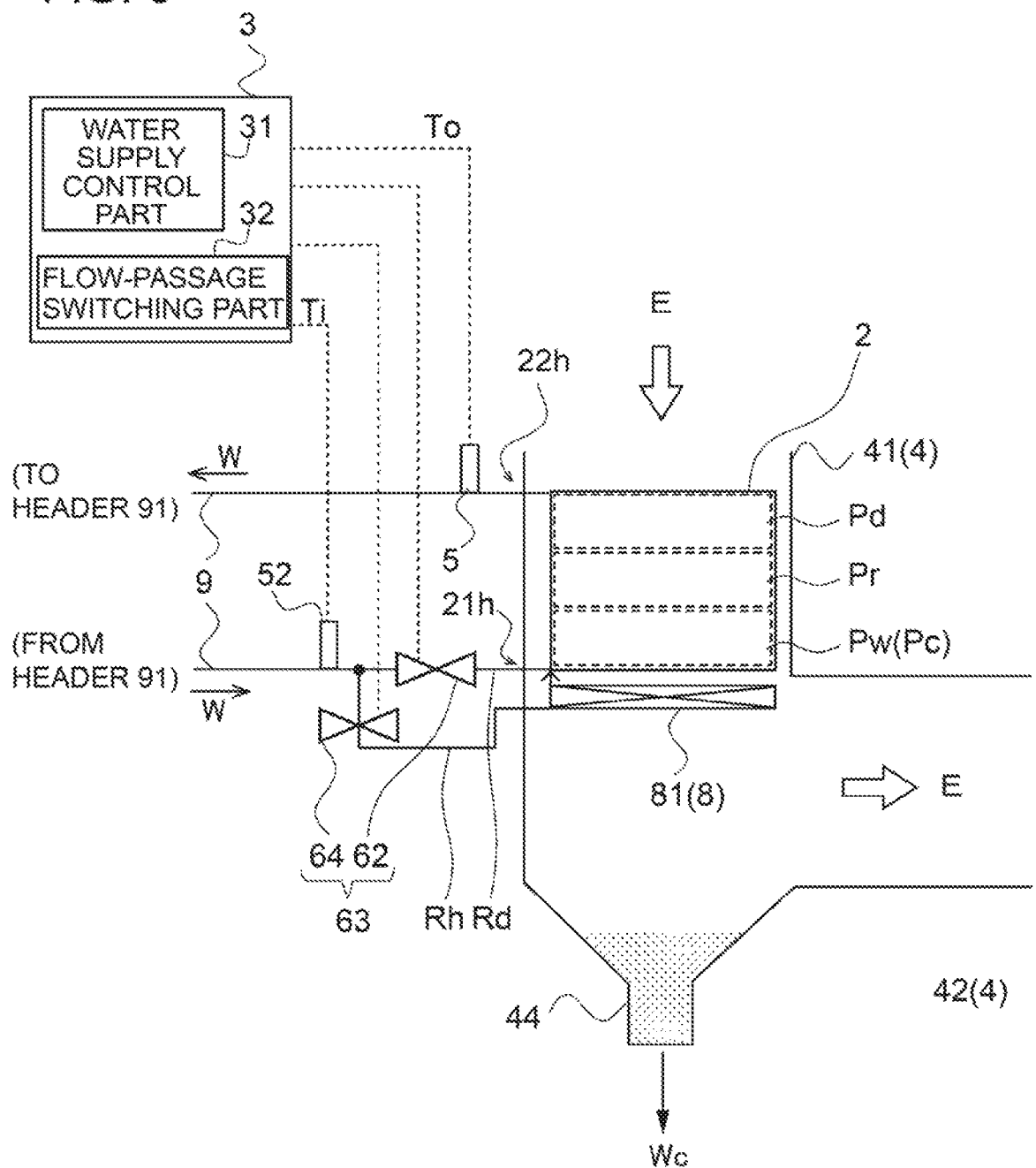

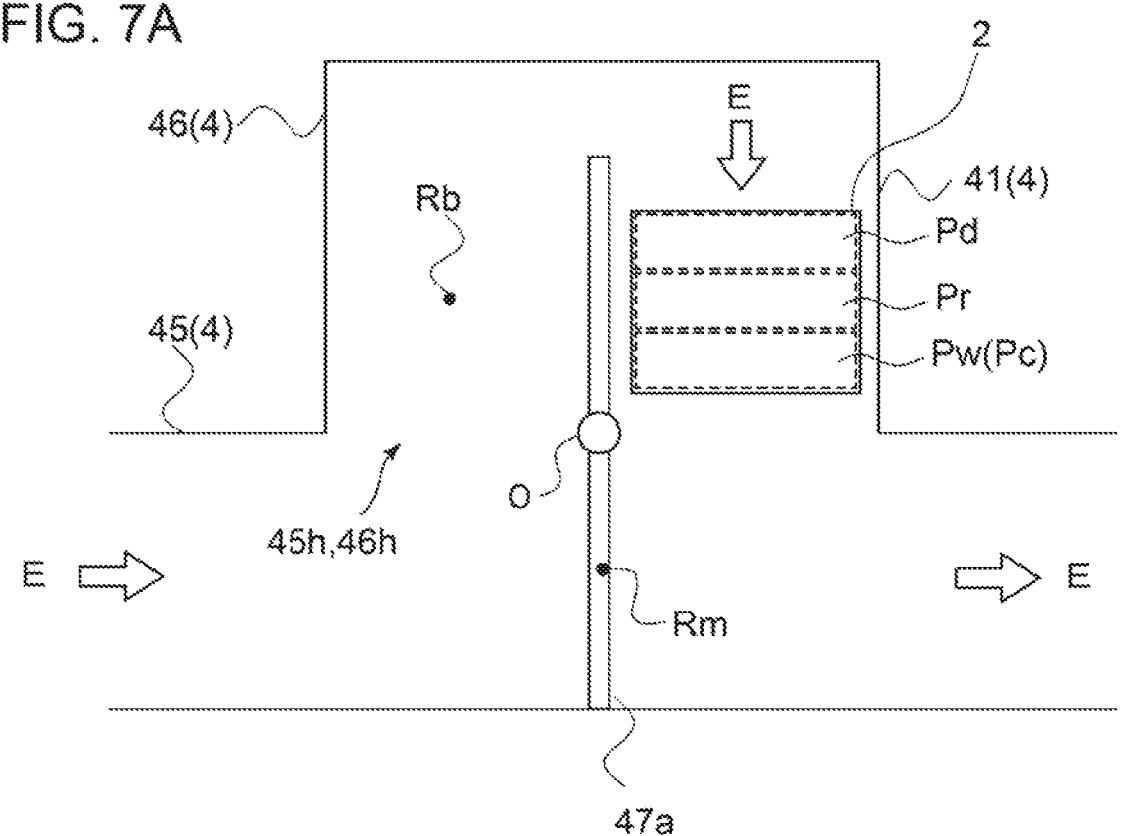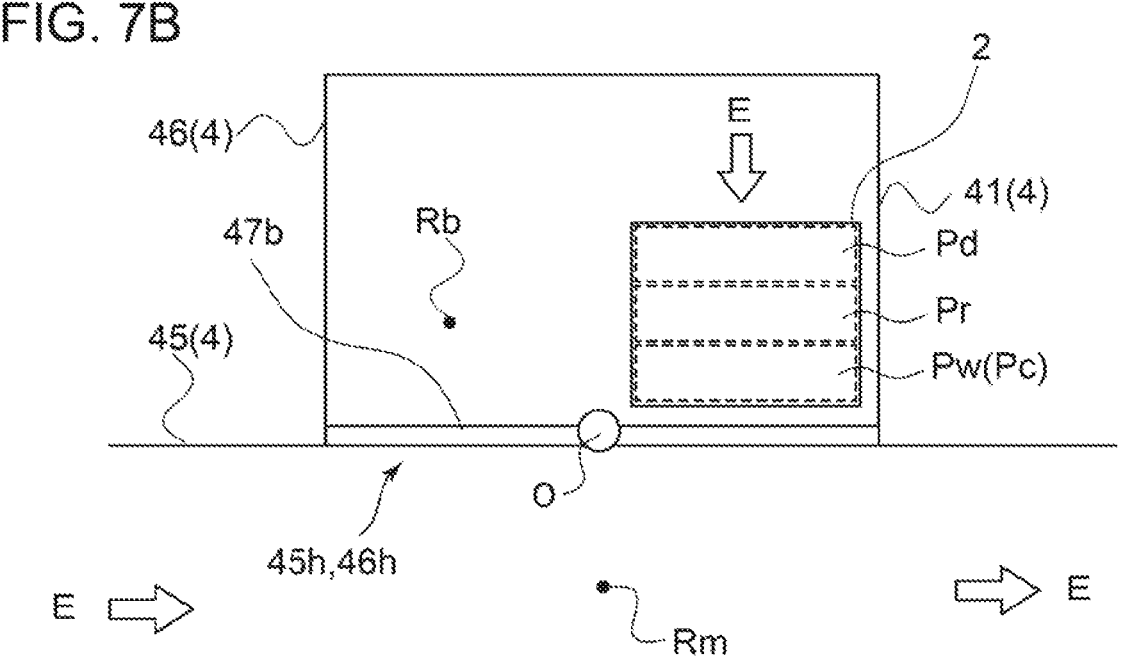

EXHAUST GAS LATENT HEAT RECOVERY DEVICE

TECHNICAL FIELD

The present disclosure relates to a latent heat recovery device for recovering latent heat of exhaust gas, especially to a supply-water heater (condensation economizer) disposed in a duct forming a flow passage of exhaust gas, for heating supply water (water to be heated) with condensate latent heat of exhaust gas.

BACKGROUND ART

Typically, combustion apparatuses such as boilers are provided with an exhaust-heat recovery device to improve thermal efficiency. A known example of such an exhaust-heat recovery device is an economizer (supply water heater) for heating water to be supplied to a boiler in advance. An economizer is disposed in a duct through which exhaust gas flows, and exchanges heat with water to be heated such as boiler supply water, thereby recovering afterheat of exhaust gas. In particular, a condensation economizer is a latent-heat recovery device capable of recovering latent heat emitted when water vapor in exhaust gas becomes condensed and turns into liquid water. When a condensation economizer is provided along with a dry-type economizer for recovering mainly sensible heat of exhaust gas, thermal efficiency of a boiler improves even further. For instance, the latent-heat recovery device of Patent Document 1 is disposed in a duct through which exhaust gas flows as a downflow, at downstream of an exhaust heat (sensible heat) recovery device. Furthermore, the latent-heat recovery device is connected to a condensate circulation system of a steam turbine, and recovers latent heat of exhaust gas with condensate afterheat to improve power generation efficiency of a gas turbine combined cycle (GTCC).

Such a condensation economizer generally includes a heat transfer tube formed in a plurality of stages. Supply water flowing through the inside of the heat transfer tube exchanges heat with exhaust gas flowing through the outside of the heat transfer tube, and thereby supply water is heated by utilizing condensate latent heat of exhaust gas. That is, the water vapor contained in exhaust gas reaches the condensate temperature when passing through the heat transfer tube of the condensate economizer, and the state changes from water vapor to liquid water (condensate water). Thus, the heat transfer tube of the condensate economizer has a region (condensate region) formed therein, where condensate water is produced, while exhaust gas before reaching the condensate temperature passes through a section of the heat transfer tube upstream of the condensate region and forms a dry region. The position of the condensate region formed in the heat transfer tube fluctuates (moves) in accordance with fluctuation of the exhaust gas temperature caused by fluctuation of the boiler load, for instance, and thus a dry-wet alternation region is formed in the heat transfer tube, where a dry state and a wet state are repeated. That is, the dry-wet alternation region is a region in which cooling and heating in the heat transfer tube are repeated, thus being a region where stress corrosion cracking (SCC) of heat transfer tube may occur. To prevent SCC due to the dry-wet alternation region, in Patent Document 2, a condensate economizer is disposed in a duct through which exhaust gas flows as an upward flow, and is configured such that exhaust gas reaches the condensate temperature in the vicinity of the upper section of the condensate economizer. Accordingly, the entire heat transfer tube of the condensate economizer is humidified, and thereby generation of a dry-wet alternation region is prevented.

CITATION LIST

Patent Literature

Patent Document 1: JP204-169693A
Patent Document 2: 2012-7818A

SUMMARY

Problems to be Solved

However, the condensate economizer disclosed in Patent Document 2 is disposed in a duct through which an upward flow of exhaust gas flows, thus a duct in which a condensate economizer can be disposed is limited. Further, the object of Patent Document 2 is to prevent generation itself of a dry-wet alternation region in the heat transfer tube, and thus the document does not disclose any measure for addressing SCC or the like of the heat transfer tube.

In view of the above, an object of at least one embodiment of the present invention is to provide a latent-heat recovery device having a high mountability to a duct and a high maintainability, by suppressing fluctuation of a dry-wet alternation region generated in a heat transfer tube.

Solution to the Problems (1) An exhaust gas latent-heat recovery device according to at least one embodiment of the present invention comprises: a heat transfer tube disposed inside a duct through which exhaust gas flows, the heat transfer tube having a water supply inlet into which water to be heated for recovering latent heat of the exhaust gas is supplied and a water supply outlet through which the water to be heated is discharged; and a water supply control part configured to control supply of the water to be heated to the water supply inlet. The water supply control part is configured to control supply of the water to be heated from the water supply inlet so that an outlet temperature being a temperature of the water to be heated at the water supply outlet is at a set temperature.

With the above configuration (1), the condition for supplying water to be heated into the heat transfer tube disposed inside the duct is controlled (set) on the basis of the outlet temperature of water to be heated at the water supply outlet of the heat transfer tube. In other words, while the latent-heat recovery device is installed inside the duct, a wet region (condensate region) is normally formed, humidified by condensate water produced in the heat transfer tube of the condensate economizer for recovery of latent heat. Furthermore, exhaust gas before reaching the condensate temperature passes through the section of the heat transfer tube disposed upstream of the condensate region in the duct, and a dry region is formed in the section. Thus, the boundary between the dry region and the condensate region (wet region) varies between the upstream end side and the downstream end side of the heat transfer tube (in the middle section) depending on the temperature of the exhaust gas passing through the duct, for instance, and thus the dry-wet alternation region repeating a dry state and a wet state alternately is formed in at least a part of the heat transfer tube. Meanwhile, with the above configuration, supply of water to be heated is controlled so that the outlet temperature of water to be heated reaches a predetermined temperature (set temperature), and thus it is possible to suppress fluctuation of the boundary between the dry region and the condensate region (wet region), and thus it is possible to limit the range in which the dry-wet alternation region is formed in the heat transfer tube. Furthermore, by suppressing fluctuation of the dry-wet alternation region, it is possible to narrow the region where damage such as SCC may occur in the heat transfer tube, which makes it possible to perform maintenance including tests and replacements quickly and easily.

(2) In some embodiments, in the above configuration (1), the water supply control part is configured to control a flow rate of the water to be heated supplied to the water supply inlet.

With the above configuration (2), water to be heated is supplied to the water supply inlet by controlling the flow rate of water to be heated. Accordingly, by increasing and reducing the flow rate of water to be heated supplied to the water supply inlet, it is possible to maintain the outlet temperature at the set temperature easily.

(3) In some embodiments, in the above configuration (1) or (2), the heat transfer tube is disposed inside the duct so that the water supply inlet is positioned on a downstream side of the duct and the water supply outlet is positioned on an upstream side of the duct, and the set temperature is determined so that a condensate temperature of the exhaust gas is formed in a specific region of a middle section of the heat transfer tube disposed between the water supply inlet and the water supply outlet.

With the above configuration (3), the heat transfer tube is disposed inside the duct so that water to be heated flowing through the inside of the heat transfer tube flows from downstream toward upstream of the duct, in a direction opposite to the flow direction of the exhaust gas. Accordingly, it is possible to form the condensate temperature of water vapor contained in the exhaust gas in the middle section of the heat transfer tube. Furthermore, it is possible to vary the temperatures of the heat transfer tube and the exhaust gas over the entire region of the heat transfer tube, and thus to improve the heat recovery efficiency. Furthermore, by adjusting the set temperature, it is possible to form the dry-wet alternation region in a region (specific region) of the middle section, which makes it possible to perform maintenance quickly and easily.

(4) In some embodiments, in the above configuration (3), the heat transfer tube includes: linear tube sections extending linearly in a direction orthogonal to a flow passage formed by the duct; and a curved tube section coupling end portions of two of the linear tube sections with each other. The middle section comprises at least one heat transfer tube module comprising a predetermined number of the linear tube sections, the predetermined number being two or more, and at least one of the curved tube section coupling the linear tube sections arranged along the flow passage. A tube coupling is disposed on each of both end portions of the heat transfer tube module.

With the above configuration (4), even in a case where damage such as corrosion occurs in the dry-wet alternation region formed in at least a part of the middle section, the middle section is formed by the heat transfer tube modules coupled by tube couplings such as the unions, for instance, and thereby it is possible to replace the damaged section in the units of the heat transfer tube modules. Thus, it is not necessary to replace the entire heat transfer tube, and thus the replacement costs can be reduced. Furthermore, it is possible to adjust the size of the heat transfer tube through the number of the heat transfer tube modules, which makes it possible to build the latent-heat recovery device flexibly corresponding to the size, and to prepare back-up heat transfer tube modules easily.

(5) In some embodiments, in any one of the above configuration (3) or (4), the heat transfer tube includes: linear tube sections extending linearly in a direction orthogonal to a flow passage formed by the duct; and a curved tube section coupling end portions of two of the linear tube sections with each other. The middle section includes at least one of the linear tube sections, and the linear tube sections and the curved tube section are coupled by a tube coupling in the middle section.

With the above configuration (5), even in a case where damage such as corrosion occurs in the dry-wet alternation region formed in at least a part of the middle section, the middle section is formed by the linear tube sections coupled by tube couplings such as the unions, for instance, and thereby it is possible to replace the damaged section in the units of linear tube sections. Thus, it is not necessary to replace the entire heat transfer tube, and thus the replacement costs can be reduced. Furthermore, it is possible to adjust the size of the heat transfer tube through the number of the linear tube sections, which makes it possible to build the latent-heat recovery device flexibly corresponding to the size, and to prepare back-up linear tube sections easily.

(6) In some embodiments, in the above configuration (3), the heat transfer tube includes: linear tube sections extending linearly in a direction orthogonal to a flow passage formed by the duct; and a curved tube section coupling end portions of two or more of the linear tube sections. The latent-heat recovery device further comprises a tube sheet configured to fix end portions of the linear tube portions on each of both ends of the linear tube sections, and the middle section includes at least one of the linear tube sections.

With the above configuration (6), even in a case where damage such as corrosion occurs in the dry-wet alternation region formed in at least a part of the middle section, the middle section is formed by the linear tube sections coupled by tube sheets, and thereby it is possible to replace the damaged section in the units of linear tube sections. Thus, it is not necessary to replace the entire heat transfer tube, and thus the replacement costs can be reduced. Furthermore, it is possible to adjust the size of the heat transfer tube through the size of the tube sheets, which makes it possible to build the latent-heat recovery device flexibly corresponding to the size, and to prepare back-up linear tube sections easily.

(7) In some embodiments, in any one of the above configurations (1) to (6), the exhaust gas latent-heat recovery device further comprises a heating unit for pre-heating the water to be heated. The water supply control part is configured to, if a temperature of the water to be heated is not higher than a predetermined temperature, supply the water to be heated which is pre-heated by the heating unit to the water supply inlet.

With the above configuration (7), water to be heated is pre-heated if the temperature of water to be heated supplied from the water supply inlet is not higher than a predetermined temperature. Accordingly, it is possible to suppress fluctuation of the boundary between the dry region and the condensate region (wet region) formed in the heat transfer tube, and thus it is possible to limit the range in which the dry-wet alternation region is formed in the heat transfer tube.

(8) In some embodiments, in any one of the above configurations (1) to (7), the duct includes: a first duct forming a bypassed passage; and a second duct forming a bypass passage bypassing the bypassed passage. The latent-heat recovery device further comprises a damper for switching the bypassed passage and the bypass passage, and the heat transfer tube is disposed in the bypass passage.

With the above configuration (8), with the damper, exhaust gas flowing through the duct can pass through at least one of the bypassed passage formed in the first duct or the bypass passage formed in the second duct. Thus, at maintenance such as check and replacement of the heat transfer tube, the passage is switched so that exhaust gas flows through the bypassed passage, and thus it is possible to perform maintenance without stopping a combustion device such as a boiler.

(9) In some embodiments, in any one of the above configurations (1) to (8), the water supply inlet and the water supply outlet are coupled to a header, and the header and at least one of the water supply inlet or the water supply outlet is coupled to each other via a flexible tube.

With the above configuration (9), with the flexible tube, it is possible to provide the coupling with the header easily, and to perform plug work (closure) easily in emergency.

(10) In some embodiments, in any one of the above configurations (1) to (9), the exhaust gas is exhaust gas discharged from a boiler.

With the above configuration (10), the exhaust-heat recovery device is disposed in a duct through which exhaust gas flows from a boiler. Accordingly, it is possible to recover latent heat of exhaust gas from the boiler.

Advantageous Effects

According to at least one embodiment of the present invention, it is possible to provide a latent-heat recovery device having a high mountability to a duct and a high maintainability, by suppressing fluctuation of a dry-wet alternation region formed in a heat transfer tube.

BRIEF DESCRIPTION OF DRAWINGS

FIG. 6 is a schematic configuration diagram of a latent-heat recovery device of exhaust gas according to an embodiment of the present invention, showing a latent-heat recovery device provided with a heating unit for water to be heated.

FIG. 7A is a diagram of a latent-heat recovery device installed in a duct including a bypass passage according to an embodiment of the present invention, showing a state in which exhaust gas passes through the bypass passage.

FIG. 7B is a diagram of a latent-heat recovery device installed in a duct including a bypass passage according to an embodiment of the present invention, for describing a state in which exhaust gas passes through a bypassed passage.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
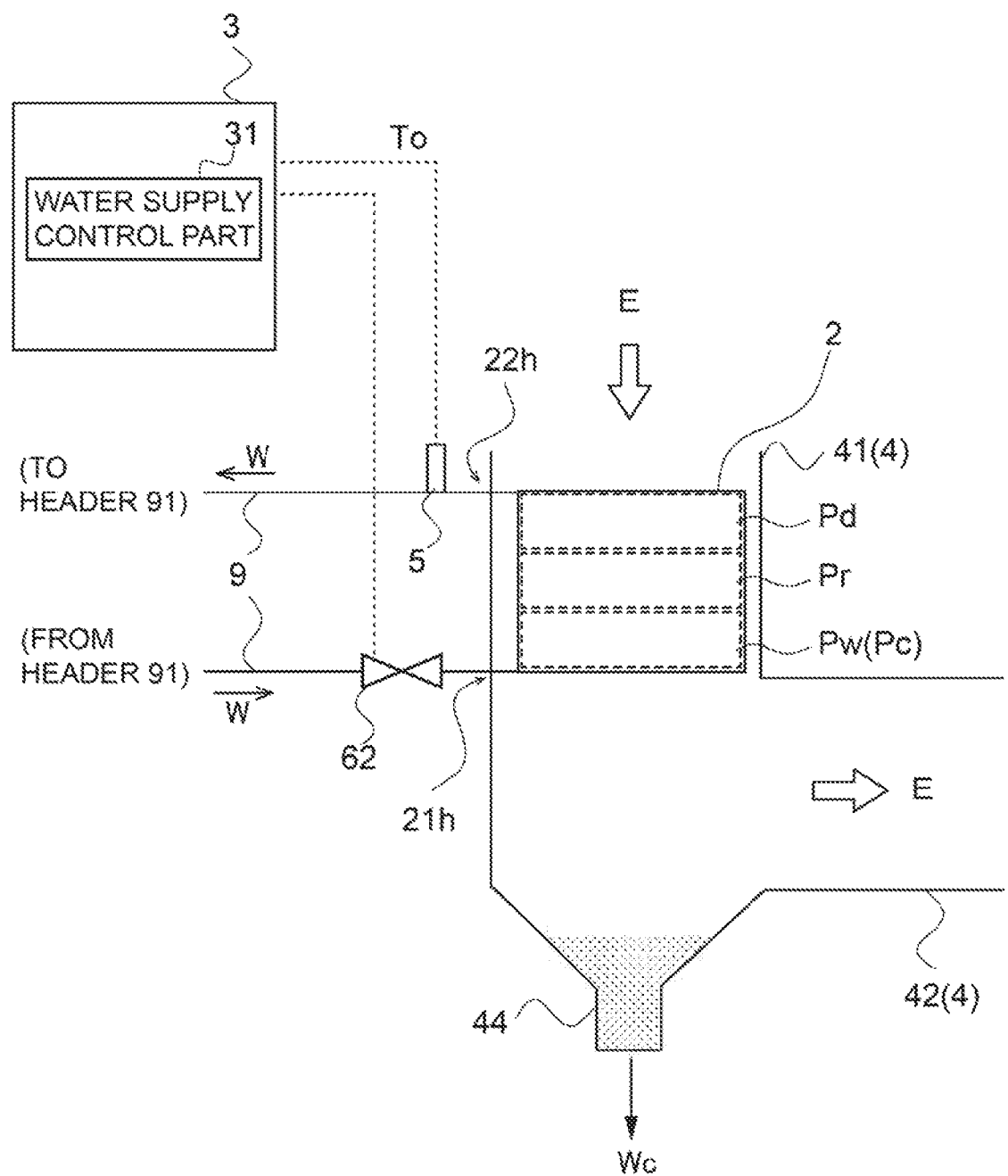
FIG. 1 is a schematic configuration diagram of a latent-heat recovery device of exhaust gas according to an embodiment of the present invention.
Figure 2:
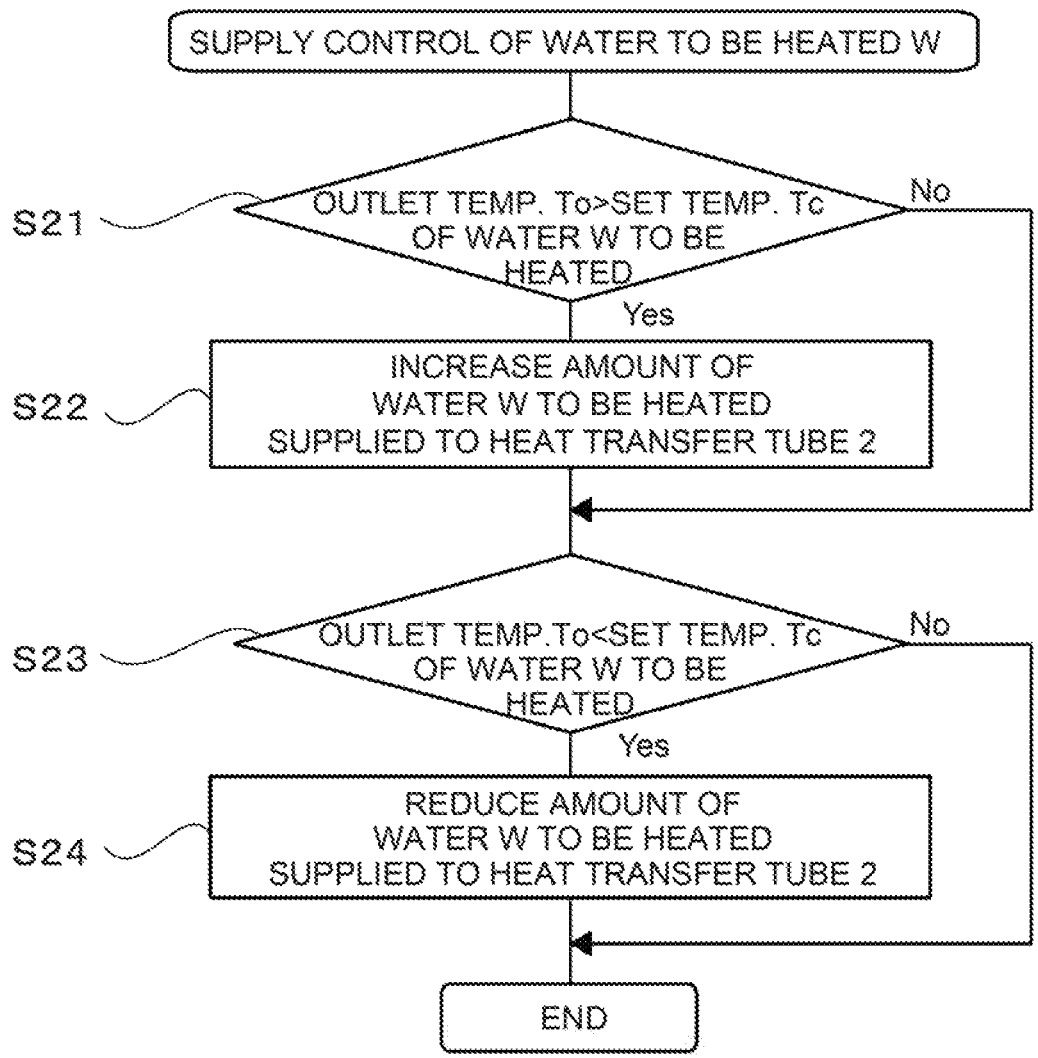
FIG. 2 is a flowchart of control by a water supply control part of a latent-heat recovery device according to an embodiment of the present invention, which controls the water amount of water to be heated.
Figure 3:
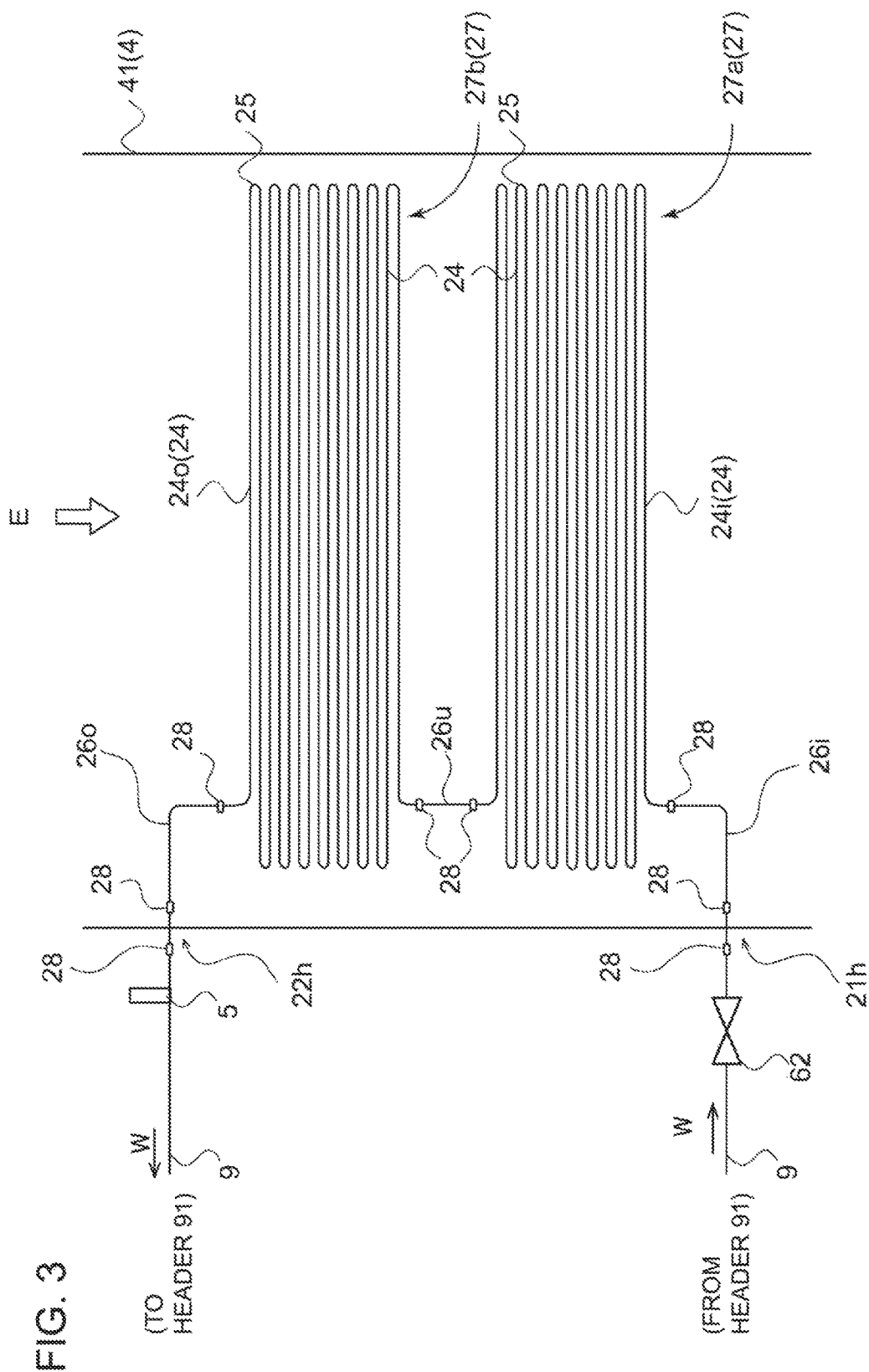
FIG. 3 is a configuration diagram of a heat transfer tube according to an embodiment of the present invention, showing a heat transfer tube formed by heat transfer tube modules connected via tube couplings.
Figure 4:
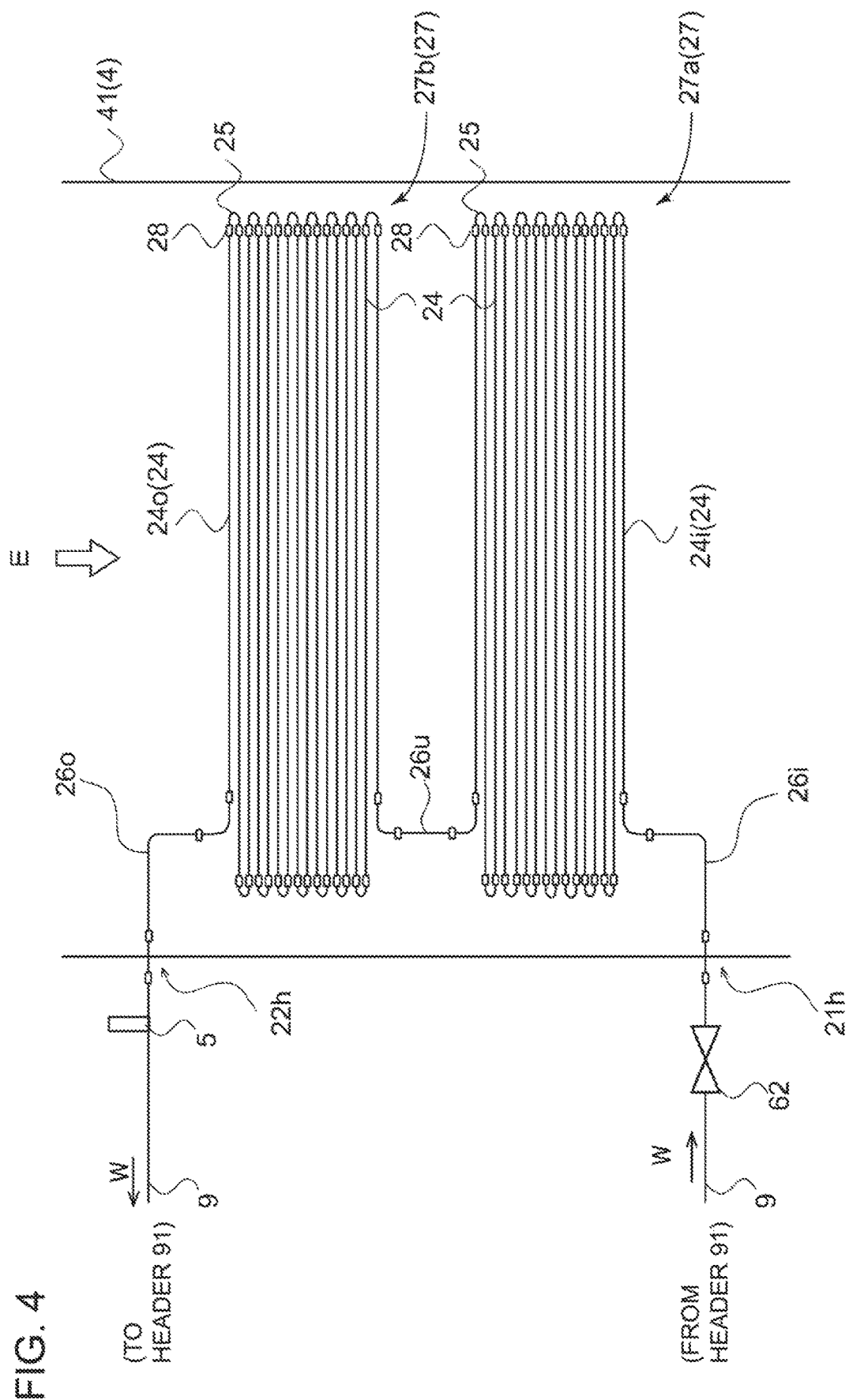
FIG. 4 is a configuration diagram of a heat transfer tube according to an embodiment of the present invention, showing a heat transfer tube formed by linear tube sections connected via tube couplings.
Figure 5:
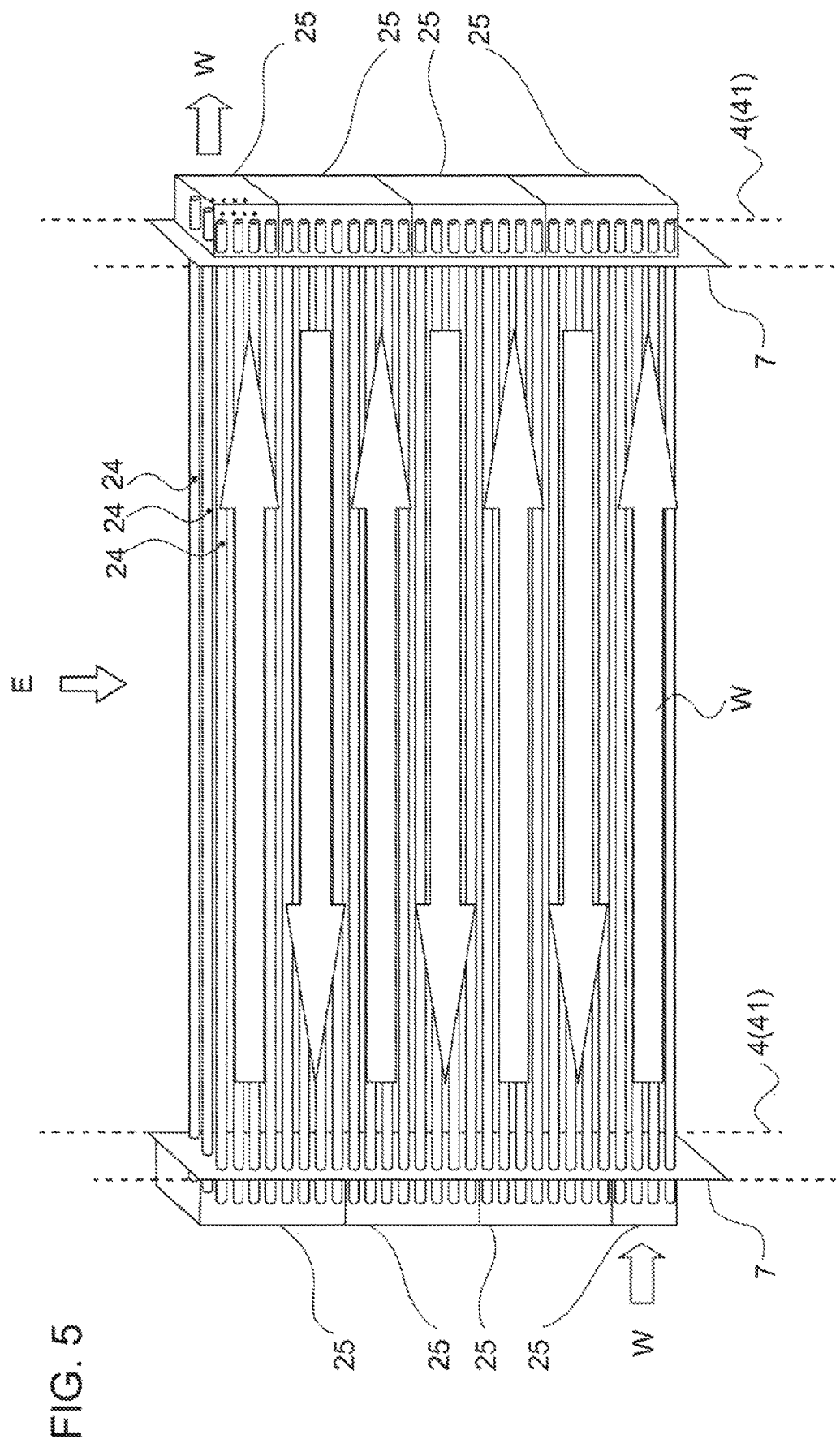
FIG. 5 is a configuration diagram of a heat transfer tube according to an embodiment of the present invention, showing a heat transfer tube formed by linear tube sections connected via tube sheets.

FIGS. 1 and 6 are each a schematic configuration diagram of a latent-heat recovery device 1 of exhaust gas E according to an embodiment of the present invention. FIG. 2 is a flowchart of control by a water supply control part 31 of the latent-heat recovery device 1 according to an embodiment of the present invention. FIGS. 3 to 5 are each a configuration diagram of a heat transfer tube 2 according to an embodiment of the present invention. As shown in FIGS. 1 and 6, the latent-heat recovery device 1 of exhaust gas E (hereinafter, referred to as latent-heat recovery device 1) includes a heat transfer tube 2 and a water supply control part 31, and is disposed in a duct 4 through which exhaust gas E flows.

According to the embodiment shown in FIGS. 1 and 6, the latent-heat recovery device 1 is a condensate economizer 1. The latent-heat recovery device 1 is disposed in a duct 4 that connects to a funnel (not shown) for discharging exhaust gas E from a boiler to atmosphere, and thereby heats water (water W to be heated) by utilizing condensate latent heat of the exhaust gas E. Furthermore, in the example shown in FIGS. 1 and 6, a dry-type economizer (not shown) for recovering sensible heat of exhaust gas E is disposed on the upstream side of the condensate economizer 1 of the duct 4. The latent-heat recovery device 1 and the dry-type economizer (not shown) are used together to improve thermal efficiency of the boiler. In some other embodiments, the latent-heat recovery device 1 may be disposed in the duct 4 which conveys exhaust gas E produced by a combustion apparatus such as a diesel engine, a gas turbine, a combustion furnace, and a heating furnace.

Next, the heat transfer tube 2 and the water supply control part 31 of the latent-heat recovery device 1 (condensate economizer 1) of exhaust gas E will be described.

As shown in FIGS. 1 to 8B, the heat transfer tube 2 is disposed inside the duct 4 through which the exhaust gas E flows. The heat transfer tube 2 has a water supply inlet 21$h$ supplied with water W to be heated for recovering latent heat of the exhaust gas E and a water supply outlet 22$h$ for discharging water W to be heated. In other words, the heat transfer tube 2 is a tube inside which a passage (water supply passage 9) for conveying water W to be heated is formed, and serves as a heat exchanger for exchanging heat between water W to be heated flowing through the inside of the heat transfer tube 2 and having a relatively low temperature and exhaust gas E flowing outside the heat transfer tube 2 along the duct 4 and having a relatively high temperature. Through this heat exchange, heat of the exhaust gas E is transmitted to the water W to be heated, and the temperature of the water W to be heated increases. In the embodiments shown in FIGS. 1 to 8B, the heat transfer tube 2 has a shape folded back to have a wavy multi-stage shape, to increase the area of contact with exhaust gas E (see FIGS. 3 to 5).

The heat transfer tube 2 has the water supply inlet 21$h$ disposed on an end portion of the heat transfer tube 2 and the water supply outlet 22$h$ disposed on another end portion of the heat transfer tube 2, to let the water W to be heated flow through the inside of the heat transfer tube 2. Furthermore, the water supply inlet 21$h$ and the water supply outlet 22$h$ are both coupled to a water supply passage 9 disposed outside the duct 4. Furthermore, the water W to be heated flowing from the water supply passage 9 is supplied into the heat transfer tube 2 through the water supply inlet 21$h$ and is discharged outside to the water supply passage 9 through the water supply outlet 22$h$ after flowing through the inside (flow passage) of the heat transfer tube 2. In the embodiments shown in FIGS. 1 and 6, the water supply inlet 21$h$ and the water supply outlet 22$h$ are coupled to a header 91. Furthermore, the water supply inlet 21$h$ of the heat transfer tube 2 is disposed downstream of a condenser (not shown), and water from the condenser (not shown) flows into the water supply inlet 21$h$. The water supply outlet 22$h$ is coupled to a boiler (not shown). In some other embodiments, the water supply outlet 22$h$ may be coupled to a device that utilizes heat such as a water heater of a factory, and used for heat exchange with such a device.

Furthermore, the heat transfer tube 2 is disposed inside the duct 4 through which exhaust gas E flows, as described above. In the embodiments shown in FIGS. 1 to 8B, as shown in the drawings, the duct 4 includes a descending section 41 formed so as to guide exhaust gas E from above toward bottom, and a horizontal section 42 coupled to the downstream side of the descending section 41 and formed so as to guide exhaust gas E in the horizontal direction. Furthermore, the heat transfer tube 2 is disposed inside the descending section 41. However, the configuration is not limited to this embodiment, and in some other embodiments, the heat transfer tube 2 may be disposed in the above horizontal section 42 through which exhaust gas E flows in the horizontal direction, or in a section of the duct 4 forming an upward flow of exhaust gas. That is, the heat transfer tube 2 can be installed regardless of the flow direction of exhaust gas E.

As described below, water vapor contained in exhaust gas E reaches the condensate temperature and becomes condensed while passing through the heat transfer tube 2, and the produced condensate water Wc drops from the heat transfer tube 2. Thus, in the example shown in FIGS. 1 and 6, a drain discharge outlet 44 for discharging the dropped condensate water Wc (drain water) outside the duct 4 is formed on the lower part of the horizontal section 42 disposed below the descending section 41 of the duct 4.

The water supply control part 31 is a unit for controlling supply of water W to be heated to the water supply inlet 21$h$. The water supply control part 31 controls supply of water W to be heated from the water supply inlet 21$h$ so that the outlet temperature To, which is the temperature of water W to be heated at the water supply outlet 22$h$, becomes a set temperature Tc. That is, the water supply control part 31 controls supply of water W to be heated so as to reduce the outlet temperature To of the water W to be heated if the outlet temperature To of the water W to be heated is higher than the set temperature Tc (To>Tc). In contrast, the water supply control part 31 controls supply of water W to be heated so as to increase the outlet temperature To of the water W to be heated if the outlet temperature To of water W to be heated is lower than the set temperature Tc (To<Tc). Accordingly, the outlet temperature To of the water W to be heated is controlled to be at a predetermined value (set temperature Tc). In the embodiments shown in FIGS. 1 and 6, as shown in FIG. 2, water W to be heated is supplied to the water supply inlet 21$h$ by controlling the flow rate of the water W to be heated supplied to the water supply inlet 21$h$. As described above, by increasing and reducing the flow rate of water W to be heated supplied to the water supply inlet 21$h$, it is possible to maintain the outlet temperature To at the set temperature Tc easily.

With reference to FIG. 2, if it is detected that the outlet temperature To of water W to be heated is higher than the set temperature Tc in step S21 (To>Tc), the water amount of water W to be heated supplied to the heat transfer tube 2 is increased in step 22. In contrast, if it is detected that the outlet temperature To of water W to be heated is lower than the set temperature Tc in step S23 (To<Tc), the water amount of water W to be heated supplied to the heat transfer tube 2 is reduced in step S24. That is, by increasing the water amount of water W to be heated when water W to be heated flows through the water supply inlet 21$h$ into the heat transfer tube 2, it is possible to increase the water amount flowing through the heat transfer tube 2, and to reduce the outlet temperature To of water W to be heated. In contrast, by reducing the water amount of water W to be heated passing through the water supply inlet 21$h$, it is possible to reduce the water amount flowing through the heat transfer tube 2, and to increase the outlet temperature To of water W to be heated. In some other embodiments, the water supply control part 31 may control supply of water W to be heated by controlling the water temperature of water W to be heated. Furthermore, in some yet other embodiments, the water supply control part 31 may control supply of water W to be heated by controlling both of the flow rate and the water temperature of water W to be heated.

In some embodiments, the water supply control part 31 is an electronic control device 3 (computer) provided with a processor and a memory, as shown in FIGS. 1 and 6. Specifically, a temperature sensor (outlet temperature sensor 5) for detecting the outlet temperature To is connected to the water supply control part 31, and the outlet temperature To detected by the outlet temperature sensor 5 is input. Furthermore, a water supply unit 6 for controlling the flow rate and the temperature of water W to be heated to be supplied to the water supply inlet 21$h$ of the heat transfer tube 2 is connected to the water supply control part 31, and is configured to be capable of sending a control command. In the example shown in FIG. 1, the water supply unit 6 is a flow-rate control unit 61 (e.g. a solenoid valve 62 capable of controlling the flow rate) for controlling the water amount of water W to be heated supplied to the water supply inlet 21$h$ of the heat transfer tube 2. The water supply control part 31 compares the outlet temperature To detected by the outlet temperature sensor 5 with the set temperature Tc stored in a memory, and thereby performs a water supply control as shown in FIG. 2. That is, as a result of comparison between the outlet temperature To and the set temperature Tc, if the outlet temperature To is higher than the set temperature Tc (To>Tc), the opening degree of the solenoid valve 62 is controlled so that the flow passage of water W to be heated becomes wider, and thereby the flow rate of water W to be heated passing through the water supply inlet 21$h$ is increased. In contrast, if the outlet temperature To is lower than the set temperature Tc (To<Tc), the opening degree of the solenoid valve 62 is controlled so that the flow passage of water W to be heated becomes narrower, and thereby the flow rate of water W to be heated passing through the water supply inlet 21$h$ is reduced.

In some other embodiments, the water supply control part 31 may be a flow-rate control unit 61 (e.g. wax valve) having a temperature sensor portion which detects temperature and a valve body which changes its position in accordance with the temperature detected by the temperature sensor portion. In this case, the temperature sensor portion is disposed on the side of the water supply outlet 22$h$ to monitor the outlet temperature To, and the valve body is disposed on the side of the water supply inlet 21$h$. Further, the temperature sensor portion and the valve body are coupled by a shaft, and thereby the valve body changes its position so as to widen the flow passage to the water supply inlet 21$h$ in response to an increase in the temperature of the water W to be heated, and so as to narrow the flow passage to the water supply inlet 21$h$ in response to a decrease in the temperature of water W to be heated.

It should be noted that the above set temperature Tc is not particularly limited. In the embodiments shown in FIGS. 1 to 8B, the set temperature Tc is set so that the following dry-wet alternation region Pr is formed in the middle section 23 of the heat transfer tube 2. Specifically, in a case where the temperature of exhaust gas E reaching the heat transfer tube 2 is 100° C. to 200° C. and the temperature of water W to be heated at the water supply inlet 21$h$ is 15° C. to 30° C., the set temperature Tc may be set to 80° C., for instance. In this case, at the lower section of the heat transfer tube 2, the exhaust gas temperature is reduced to 58° C. to 62° C. or below.

In the latent-heat recovery device 1 having the above configuration, when passing through the descending section 41 of the duct 4, the exhaust gas E passes each stage of the heat transfer tube 2 formed to have a wavy multi-stage shape in order. At this time, heat is exchanged via the heat transfer tube 2 between the water W to be heated flowing through the inside of the heat transfer tube 2 and having a relatively low temperature and the exhaust gas E flowing outside the heat transfer tube 2 along the duct 4 and having a relatively high temperature, and thus the temperature of the exhaust gas E decreases as the exhaust gas E passes through the heat transfer tube 2 from upstream toward downstream of the duct 4. At this time, the latent-heat recovery device 1 is configured such that water vapor contained in the exhaust gas E reaches the condensate temperature (58° C. to 62° C.) while passing through the heat transfer tube 2, in order to recover latent heat of the exhaust gas E, and a condensate region Pc in which condensate water Wc is produced is formed in the heat transfer tube 2. Furthermore, in the flow direction of the exhaust gas E, exhaust gas E before reaching the condensate temperature passes through a section of the heat transfer tube 2 that is upstream of the condensate region Pc, and thus a dry region Pd is formed in the section.

Accordingly, the dry region Pd and the condensate region Pc are formed in the heat transfer tube 2 along the flow direction of the exhaust gas E, and the position of the boundary between the dry region Pd and the condensate region Pc varies depending on the temperature or the like of the exhaust gas E. Specifically, when the temperature of the exhaust gas E increases, the condensate region Pc tends to move toward downstream of the heat transfer tube 2. In contrast, when the temperature of the exhaust gas E decreases, the condensate region Pc tends to move upstream of the heat transfer tube 2. The condensate region Pc fluctuates as described above, and thus a dry-wet alternation region Pr is formed between the dry region Pd and the condensate region Pc in the heat transfer tube 2, where a dry state and a wet state are repeated. In the embodiment shown in FIGS. 1 and 6, the dry region Pd is formed in the upper section of the heat transfer tube 2 (the outlet-side end portion 22 in the example shown in FIGS. 1 to 8B), and the condensate region Pc is formed in the entire section below the dry region Pd (in the example shown in FIGS. 1 to 8B, the inlet-side end portion 21 and the middle section 23). Furthermore, since the condensate region Pc fluctuates as descried above, the dry-wet alternation region Pr is formed between the condensate region Pc (wet region Pw) and the dry region Pd.

However, supply of water W to be heated is controlled by the latent-heat recovery device 1 of the present invention so as to maintain the outlet temperature To of water W to be heated at the set temperature Tc. Specifically, when the temperature of exhaust gas E increases, the outlet temperature To of water W to be heated increases, and the condensate region Pc in the heat transfer tube 2 tries to move toward downstream. However, the extent of heat exchange is increased by the latent-heat recovery device 1 so as to cancel the downstream movement of the condensate region Pc due to an increase in the temperature of exhaust gas E, and thereby a control is performed to reduce the temperature of exhaust gas E to the condensate temperature at an earlier stage (more upstream of the duct 4). In other words, a control is performed so that the condensate region Pc moves further upstream of the duct 4. Accordingly, the cooling power of the heat transfer tube 2 is enhanced when the temperature of exhaust gas E increases, which suppresses downstream movement of the condensate region Pc.

In contrast, when the temperature of exhaust gas E decreases, the outlet temperature To of water W to be heated decreases, and the condensate region Pc in the heat transfer tube 2 tries to move upstream. However, the extent of heat exchange is reduced by the latent-heat recovery device 1 so as to cancel the upstream movement of the condensate region Pc due to a decrease in the temperature of exhaust gas E, and thereby a control is performed to further retard arrival of the temperature of exhaust gas E at the condensate temperature. In other words, a control is performed so that the condensate region Pc moves further downstream of the duct 4. Thus, the cooling power of the heat transfer tube 2 is weakened when the temperature of exhaust gas E decreases, which suppresses upstream movement of the condensate region Pc. As described above, the latent-heat recovery device 1 detects a change of the environment such as a temperature change of exhaust gas E from the outlet temperature To, and controls supply of water W to be heated from the water supply inlet 21h so as to cancel the temperature change. Accordingly, fluctuation of the condensate region Pc in the heat transfer tube 2 is suppressed.

In the embodiment shown in FIGS. 1 and 6, the condensate region Pc is formed over the entire section below the dry region Pd (in the example shown in FIGS. 1 to 81B, the inlet-side end portion 21 and the middle section 23), but the configuration is not limited to this. In some other embodiments, the condensate region Pc may be formed only in the middle section 23 of the heat transfer tube 2. In this case, if condensate water moves (falls), for instance in a case where the heat transfer tube 2 is disposed in the descending section 41 of the duct 4 for instance (see FIGS. 1 to 8b), the wet region Pw may be formed in the heat transfer tube 2 downstream of the condensate region Pc, being humidified by movement (fall) of condensate water. Alternatively, if condensate water does not move, for instance in a case where the heat transfer tube 2 is disposed in the horizontal section 42 of the duct 4, the dry region Pd may be formed in the heat transfer tube 2 downstream of the condensate region Pc. Furthermore, in some other embodiments, the condensate region Pc may be formed in the entire section above the heat transfer tube 2 (in the example shown in FIGS. 1 to 8B, the section including at least the outlet-side end portion 22), in case of which the dry region Pd may not be necessarily formed.

With the above configuration, the condition for supplying water W to be heated into the heat transfer tube 2 disposed inside the duct 4 is controlled (set) on the basis of the outlet temperature To of water W to be heated at the water supply outlet 22h of the heat transfer tube 2. In other words, while the latent-heat recovery device 1 is installed inside the duct 4, a wet region (condensate region Pc) is normally formed, humidified by condensate water Wc produced in the heat transfer tube 2 of the condensate economizer 1 for recovery of latent heat. Furthermore, exhaust gas E before reaching the condensate temperature passes through the section of the heat transfer tube 2 disposed upstream of the condensate region Pc in the duct 4, and a dry region Pd is formed in the section. Thus, the boundary between the dry region Pd and the condensate region Pc (wet region Pw) varies between the upstream end side and the downstream end side of the heat transfer tube 2 (in the middle section 23) depending on the temperature of the exhaust gas E passing through the duct 4, for instance, and thus the dry-wet alternation region Pr repeating a dry state and a wet state alternately is formed in at least a part of the heat transfer tube 2. Meanwhile, with the above configuration, supply of water W to be heated is controlled so that the outlet temperature To of water W to be heated reaches a predetermined temperature (set temperature Tc), and thus it is possible to suppress fluctuation of the boundary between the dry region Pd and the condensate region Pc (wet region Pw), and thus it is possible to limit the range in which the dry-wet alternation region Pr is formed in the heat transfer tube 2. Furthermore, by suppressing fluctuation of the dry-wet alternation region Pr, it is possible to narrow the region where damage such as SCC may occur in the heat transfer tube 2, which makes it possible to perform maintenance including tests and replacements quickly and easily.

Further, in some embodiments, as shown in FIGS. 1 to 8B, the heat transfer tube 2 is disposed inside the duct 4 so that the water supply inlet 21h is positioned downstream of the duct 4 and the water supply outlet 22h is positioned upstream of the duct 4, and the set temperature Tc is determined so that the condensate temperature of exhaust gas E is formed in a specific region of the middle section 23 of the heat transfer tube 2 between the water supply inlet 21h and the water supply outlet 22h. In the example shown in FIGS. 1 and 6, an end portion of the heat transfer tube 2 disposed on the side where the water supply inlet 21h is disposed is the inlet-side end portion 21, and an end portion of the heat transfer tube 2 where the water supply outlet 22h is disposed is the outlet-side end portion 22. The middle section 23 is a section of the heat transfer tube 2 between the inlet-side end portion 21 and the outlet-side end portion 22.

As described above, in a case where the heat transfer tube 2 is disposed in the duct 4, the exhaust gas E flows so as to pass through the inlet-side end portion 21 after passing through the outlet-side end portion 22 of the heat transfer tube 2. Furthermore, the water W to be heated flows from downstream toward upstream of the duct 4. Accordingly, with the water W to be heated flowing opposite to the flow direction of exhaust gas E, the inlet-side end portion 21 is supplied with the water W to be heated from outside, and thereby the downstream side of the heat transfer tube 2 is maintained at a low temperature. Thus, the exhaust gas E flowing from the outlet-side end portion 22 toward the inlet-side end portion 21 of the heat transfer tube 2 is cooled reliably toward the inlet-side end portion 21 on the downstream side, and the condensate region Pc is formed in a part of the middle section 23. Thus, the dry-wet alternation region Pr is formed in at least a part of the middle section 23.

Furthermore, with the water W to be heated flowing opposite to the flow direction of exhaust gas E, the heat transfer tube 2 has a relatively low temperature at the side of the inlet-side end portion 21 of the downstream side and a relatively high temperature at the side of the outlet-side end portion 22 of the upstream side, when the exhaust gas E passes through the heat transfer tube 2. The temperature of exhaust gas E decreases as the exhaust gas E passes through the heat transfer tube 2, and thus the temperature of the exhaust gas E is relatively high at the upstream side of the heat transfer tube 2 and relatively low at the downstream side of the heat transfer tube 2. Thus, it is possible to vary the temperatures of the exhaust gas E and the water W to be heated over the entire region from the inlet-side end portion 21 to the outlet-side end portion 22 of the heat transfer tube 2, and thus to improve the heat recovery efficiency.

In this configuration, the set temperature Tc used to control the outlet temperature To of the water W to be heated is determined so that a condensate temperature is formed in a region (specific region) of the middle section 23 of the heat transfer tube 2. As described above, in a case where the latent-heat recovery device 1 is disposed in the duct 4, exhaust gas E reaches the condensate temperature at a position in the heat transfer tube 2. Meanwhile, if the outlet temperature To of the water W to be heated is set to the low-temperature side, the condensate region Pc tends to be formed more upstream with respect to the flow of exhaust gas. If the outlet temperature To of the water W to be heated is set to the high-temperature side, the condensate region Pc tends to be formed more downstream with respect to the flow of exhaust gas. By utilizing this tendency to determine the set temperature Tc, it is possible to form the condensate region Pc in a specific region of the middle section 23 of the heat transfer tube 2. Furthermore, the dry-wet alternation region Pr is formed on the upstream end side of the condensate region Pc with respect to the flow of exhaust gas, and thus it is possible to control the position of formation of the dry-wet alternation region Pr.

With the above configuration, the heat transfer tube 2 is disposed inside the duct 4 so that water W to be heated flowing through the inside of the heat transfer tube 2 flows from downstream toward upstream of the duct 4, in a direction opposite to the flow direction of the exhaust gas E. Accordingly, it is possible to form the condensate temperature of water vapor contained in the exhaust gas E in the middle section 23 of the heat transfer tube 2. Furthermore, it is possible to vary the temperatures of the heat transfer tube 2 and the exhaust gas E reaching the downstream end portion (inlet-side end portion 21) from the upstream end portion (outlet-side end portion 22) of the heat transfer tube 2 over the entire region of the heat transfer tube 2, and thus to improve the heat recovery efficiency. Furthermore, by adjusting the set temperature Tc, it is possible to form the dry-wet alternation region Pr in a region (specific region) of the middle section 23, which makes it possible to perform maintenance quickly and easily.

Next, the configuration of the heat transfer tube 2 will be described in detail with reference to FIGS. 3 to 5.

In some embodiments, as shown in FIGS. 3 to 5, the heat transfer tube 2 includes linear tube sections 24 extending linearly in a direction orthogonal to the flow passage formed by the duct 4, and a curved tube section 25 coupling end portions of two or more linear tube sections 24. In other words, as shown in FIGS. 3 to 5, the heat transfer tube 2 includes linear tube sections 24 extending linearly, and a curved tube section 25 coupling end portions of the linear tube sections 24 with one another. The linear tube sections 24 are sections disposed in a direction orthogonal to the flow passage of the exhaust gas E formed by the duct 4, inside the duct 4, and a plurality of linear tube sections 24 are arranged so as to be parallel to one another along the duct 4. Furthermore, the curved tube section 25 couples end portions of two or more linear tube sections 24, from among the plurality of linear tube sections 24 arranged parallel to one another.

In the example shown in FIGS. 3 to 5, the right end of the linear tube section 24i closest to the water supply inlet 21h is coupled to the right end of the second adjacent linear tube section 24 disposed upstream thereof, via the first curved tube section 25. The left end of the second linear tube section 24 is coupled to the left end of the third linear tube section 24 disposed upstream thereof, via the second curved tube section 25. Furthermore, the right end of third second linear tube section 24 is coupled to the fourth adjacent linear tube section 24 disposed upstream thereof, via the third curved tube section 25. Accordingly, the linear tube sections 24 are respectively coupled via the curved tube sections 25 in a direction along the duct 4. Such reciprocation between the left end and the right end is repeated to the linear tube section 24o closest to the water supply outlet 22h, and thereby the heat transfer tube 2 having a shape that is folded back to have a wavy multi-stage shape is formed. Furthermore, in the example shown in FIGS. 3 to 5, the linear tube section 24i closest to the water supply inlet 21h and the linear tube section 24o closest to the water supply outlet 22h have an end portion coupled to another adjacent linear tube section 24 via a curved tube section 25, but the other end portion is coupled to a junction tube section 26 (26i, 26o) forming the water supply inlet 21h or the water supply outlet 22h.

In some embodiments, as shown in FIGS. 3 and 4, the heat transfer tube 2 includes linear tube sections 24 extending linearly in a direction orthogonal to the flow passage formed by the duct 4, and a curved tube section 25 coupling end portions of two or more linear tube sections 24. The middle section 23 of the heat transfer tube 2 includes at least one heat transfer tube module 27 including a predetermined number of linear tube sections 24, the predetermined number being two or more, and at least one curved tube section 25 coupling the linear tube sections 24 arranged along the flow passage formed by the duct 4. For both end portions of the heat transfer tube module 27, respective tube couplings (unions 28 in the example of FIGS. 3 and 4) are provided. Specifically, the heat transfer tube module 27 is coupled to another heat transfer tube module 27 or another portion that forms the heat transfer tube 2 such as a conjunction tube section 26, via the unions 28 (couplings). In the embodiment shown in FIG. 3, the heat transfer tube 2 includes two heat transfer tube modules 27 having the same configuration arranged along the duct 4, and coupled to each other via the unions 28 (couplings). In other words, each heat transfer tube module 27 includes a combination of the same number of linear tube sections 24 and curved tube sections 25 having the same shape, thus having the same size. In some embodiments, a plurality of heat transfer tube modules 27 having different sizes may be combined to form the middle section 28.

Furthermore, in the embodiment shown in FIGS. 3 and 4, the first heat transfer tube module 27a positioned on the downstream side of the duct 4 and the second heat transfer tube module 27b positioned on the upstream side of the duct 4 are coupled to each other via the conjunction tube sections 26 coupling the two heat transfer tube modules 27. Specifically, provided that an upstream end portion of the heat transfer tube module 27 is the upstream end portion 27u and a downstream end portion is the downstream end portion 27d, the upstream end portion 27u of the first heat transfer tube module 27a is coupled to an end of a coupling tube section 26a having a linear shape via a union 28. Furthermore, the downstream end portion 27d of the second heat transfer tube module 27b is coupled to the other end of the coupling tube section 26a having a linear shape via a union 28. In some other embodiments, the heat transfer tube modules 27 may be coupled directly at end portions via one union 28 (tube coupling).

Furthermore, the downstream end portion 27d of the first heat transfer tube module 27a is coupled to the conjunction tube section 26i having the water supply inlet 21h formed thereon, via a union 28. Furthermore, the upstream end portion 27u of the second heat transfer tube module 27b is coupled to the conjunction tube section 26o having the water supply outlet 22h formed thereon, via a union 28.

As described above, the heat transfer tube modules 27 are coupled to one another, and the heat transfer tube modules 27 are coupled to the conjunction tube sections 26 (26a, 26i, 26o), not by welding, but by tube couplings such as the unions 28. Thus, it is possible to form the heat transfer tube 2 by using a plurality of heat transfer tube modules 27, and perform replacement or the like in units of heat transfer tube modules 27 in case of partial damage of the heat transfer tube 2 such as corrosion and breakage.

In the example shown in FIGS. 3 and 4, the middle section 23 of the heat transfer tube 2 is formed by a part of the first heat transfer tube module 27a and a part of the second heat transfer tube module 27b. In this case, if damage occurs in one of the heat transfer tube modules 27, only the one heat transfer tube module 27 with damage needs to be replaced.

Furthermore, by controlling the water supply condition with the water supply control part 31 so that the dry-wet alternation region Pr is formed only in one of the heat transfer tube modules 27, it is possible to perform damage test or the like mainly on the heat transfer tube module 27 in which the dry-wet alternation region Pr is formed.

The shape of the conjunction tube section 26 is not particularly limited, and a plurality of tubes may be coupled via unions 28 or the like to form the conjunction tube sections 26 (see FIGS. 3 and 4). Furthermore, while the heat transfer tube modules 27 and the conjunction tube sections 26 are described as separate members in the above description, in a case where two heat transfer tube modules 27 form the middle section 23, for instance, the conjunction tube sections 26 (26*a*, 26*i*, 26*o*) may be a part of the heat transfer tube module, and the heat transfer tube 2 may be formed by combining heat transfer tube modules having the same configuration. Furthermore, in the example shown in FIGS. 3 and 4, while the linear tube sections 24 directly coupled to the respective conjunction tube sections (26*a*, 26*i*, 26*o*) (specifically, the linear tube sections 24 forming the upstream end portions 27*u* and the downstream end portions 27*d*) have a shorter length than the other linear tube sections 24 and include a curved section, the configuration is not limited to this embodiment. For instance, the linear tube sections 24 coupled to the respective conjunction tube sections 26 (26*a*, 26*i*, 26*o*) may have the same length as the other linear tube sections 24, without having a curved section, and instead, the respective conjunction tube sections 26 (26*a*, 26*i*, 26*o*) may have a curved portion.

With the above configuration, even in a case where damage such as corrosion occurs in the dry-wet alternation region Pr formed in at least a part of the middle section 23, the middle section 23 is formed by the heat transfer tube modules 27 coupled by tube couplings such as the unions 28, and thereby it is possible to replace the damaged section in the units of the heat transfer tube modules 27. Thus, it is not necessary to replace the entire heat transfer tube 2, and thus the replacement costs can be reduced. Furthermore, it is possible to adjust the size of the heat transfer tube 2 through the number of the heat transfer tube modules 27, which makes it possible to build the latent-heat recovery device 1 flexibly corresponding to the size, and to prepare back-up heat transfer tube modules 27 easily.

In some other embodiments, as shown in FIG. 4, the middle section 23 of the heat transfer tube 2 includes at least one linear tube section 24, and the linear tube section 24 and the curved tube section 25 are coupled to each other in the middle section 23 via a tube coupling. That is, as shown in FIG. 4, the linear tube sections 24 and the curved tube sections 25 are not coupled by welding, but coupled to each other via tube couplings.

In the embodiment shown in FIG. 4, in each heat transfer tube module 27, the linear tube sections 24 and the curved tube sections 25 are coupled via unions 28 (tube couplings). Accordingly, in each heat transfer tube module 27, replacement can be performed in the units of linear tube sections 24 and curved tube sections 25. In some other embodiments, the heat transfer tube 2 does not include the heat transfer tube modules 27. In this case, a plurality of linear tube sections 24 coupled to each other via the curved tube sections 25 are disposed between the water supply inlet 21*h* and the water supply outlet 22*h*, and thereby the entire heat transfer tube 2 and the middle section 23 of the heat transfer tube 2 are formed.

With the above configuration, even in a case where damage such as corrosion occurs in the dry-wet alternation region Pr formed in at least a part of the middle section 23, the middle section 23 is formed by the linear tube sections 24 coupled by tube couplings such as the unions 28, and thereby it is possible to replace the damaged section in the units of linear tube sections 24. Thus, it is not necessary to replace the entire heat transfer tube 2, and thus the replacement costs can be reduced. Furthermore, it is possible to adjust the size of the heat transfer tube 2 through the number of the linear tube sections 24, which makes it possible to build the latent-heat recovery device 1 flexibly corresponding to the size, and to prepare back-up linear tube sections 24 easily.

Furthermore, in some other embodiments, as shown in FIG. 5, the heat transfer tube 2 includes linear tube sections 24 extending linearly in a direction orthogonal to the flow passage formed by the duct 4, and a curved tube section 25 coupling end portions of two or more linear tube sections 24. Furthermore, the latent-heat recovery device 1 further includes a tube sheet 7 for fixing end portions of the linear tube sections 24, on each of both ends of the linear tube sections 24. Furthermore, the middle section 23 includes at least one linear tube section 24. As shown in FIG. 5, the tube sheet 7 is a plate-shaped member. Further, the tube sheet 7 has through holes formed through the plate-shaped member, and linear tubes are inserted through the through holes, thereby forming the linear tube sections 24 of the heat transfer tube 2.

In the embodiment shown in FIG. 5, the heat transfer tube 2 is formed by a plurality of linear tubes (linear tube sections 24) disposed between two tube sheets 7. More specifically, each tube sheet 7 has a plurality of through holes formed thereon along each of the vertical direction (flow direction of exhaust gas E) and the horizontal direction, and specifically, three rows of twenty-eight through holes arranged in the vertical direction are disposed on each tube sheet 7 in the horizontal direction. Furthermore, each tube sheet 7 is disposed so as to face each of a surface forming the outer wall of the duct 4 (in the example of FIG. 5, a surface of the descending section 41) and a surface facing the surface, so as to be parallel to one another. At this time, the through holes of the respective tube sheets 7 are also facing each other, and both ends of the linear tubes (linear tube sections 24) are fixed to each of the facing through holes. Furthermore, the curved tube sections 25 are disposed outside of each tube sheet 7, coupling two or more linear tube sections 24 collectively. Accordingly, the heat transfer tube 2 is configured to form a flow of water W to be heated flowing in a specific direction (from left end to right end, or from right end to left end) in each of the plurality of linear tube sections 24. Specifically, in the example of FIG. 5, focusing on the front row of the linear tube sections 24 arranged in the vertical direction of the tube sheets 7, water W to be heated supplied from the water supply inlet 21*h* is distributed to four linear tube sections 24 (that is, three rows of four make twelve in total; the same also applies to the following description), flows from the left end to the right end of each linear tube section 24 of the first stage, and reaches the curved tube section 25 of the right end. The curved tube section 25 on the right end couples eight linear tube sections 24 collectively, and water W to be heated flowing from four of the linear tube sections 24 is discharged to the remaining four linear tube sections 24 disposed on the upstream side of the duct 4 (second stage), and thereby water W to be heated is turned back from the right end to the left end of the linear tube sections 24, thus being sent to the next curved tube section 25 on the left end. The curved tube section 25 of the left end also couples eight linear tube sections 24, and water W to be heated flowing from four of the linear tube sections 24 is discharged to the remaining four linear tube sections 24 disposed on the upstream side of the duct 4 (third stage), and this configuration is repeated until reaching the water supply outlet 22h.

As described above, each linear tube section 24 is fixed by the tube sheet 7, and a flow passage of water W to be heated is formed along with the curved tube section 25. Furthermore, the linear tube sections 24 are coupled to the tube sheets 7 not by welding, but by being inserted into the through holes of the tube sheet 7. Furthermore, the curved tube sections 25 and the tube sheet 7 are also not coupled by welding, but are separatable (removable) from one another. Thus, it is possible to adjust the size of the heat transfer tube 2 through the size of the tube sheets 7, and in case damage such as corrosion and breakage occurs on a part of the heat transfer tube 2, replacement can be performed in the units of the linear tube sections 24. That is, at replacement, the curved tube section 25 coupling the linear tube sections 24 to be replaced is removed, and the linear tube sections 24 to be replaced are pulled out from the through holes, for instance, thus being removed. After inserting linear tube sections 24 for replacement into the through holes from which the linear tube sections 24 are removed, the curved tube section 25 can be attached again to the tube sheet 7.

With the above configuration, even in a case where damage such as corrosion occurs in the dry-wet alternation region Pr formed in at least a part of the middle section 23, the middle section 23 is formed by the linear tube sections 24 coupled by tube sheets 7, and thereby it is possible to replace the damaged section in the units of linear tube sections 24. Thus, it is not necessary to replace the whole heat transfer tube 2, and thus the replacement costs can be reduced. Furthermore, it is possible to adjust the size of the heat transfer tube 2 through the size of the tube sheets 7, which makes it possible to build the latent-heat recovery device 1 flexibly corresponding to the size, and to prepare back-up linear tube sections 24 easily.

Further, in some embodiments, as shown in FIG. 6, the latent-heat recovery device 1 further includes a heating unit 8 for pre-heating water W to be heated, and the water supply control part 31 supplies water W to be heated which is pre-heated by the heating unit 8 to the water supply inlet 21h in a case where the temperature of water W to be heated is not higher than a predetermined temperature. In the embodiment shown in FIG. 6, the heating unit 8 is a pre-heating tube 81. The pre-heating tube 81 is disposed downstream of the heat transfer tube 2 inside the duct 4. Furthermore, both ends of the pre-heating tube 81 are in communication with the water supply passage 9 and the water supply inlet 21h, thus forming a pre-heating route Rh through which water W to be heated reaches the water supply inlet 21h of the heat transfer tube 2 via the pre-heating tube 81.

That is, the preheating route Rh and a direct route Rd are provided as passages of water W to be heated that connect to the water supply inlet 21h. The direct route Rd is in direct communication with the water supply inlet 21h, not via the pre-heating route Rh. Furthermore, a flow-passage switching unit 63 (water supply unit 6) for switching the route between the direct route Rd and the pre-heating route Rh is disposed in the water supply passage 9. In the example of FIG. 6, the flow-passage switching unit 63 is disposed between the header 91 and the water supply inlet 21h. Further, the flow-passage switching part 63 is controlled, and thereby water W to be heated flows through at least one of the direct route Rd or the pre-heating route Rh before being supplied to the water supply inlet 21h. For instance, the flow-passage switching unit 63 may be a three-way valve coupled to the water supply passage 9, the direct route, and the pre-heating route. Alternatively, the flow-passage switching unit 63 may include a plurality of valves, and a valve may be provided for the inlet or the outlet of each of the direct route Rd and the pre-heating route Rh, so as to switch the route of water W to be heated by adjusting the opening degree of each valve. Alternatively, water W to be heated may be distributed by the flow-passage switching unit 63 to both of the direct route Rd and the pre-heating route Rh, and may be merged again at the water supply inlet 21h, and thereby a part of water W to be heated passing through the pre-heating route Rh may adjust the temperature of water W to be heated W at the water supply inlet 21h.

In some embodiments, the latent-heat recovery device 1 including the heating unit 8 includes a flow-passage switching part 32 for switching the direct route Rd and the pre-heating route Rh, as shown in FIG. 6. The flow-passage switching part 32 comprises an electronic control device (computer) having a processor and a memory. Furthermore, the flow-passage switching part 32 is connected to the flow-passage switching unit 63 and an inlet temperature sensor 52 capable of detecting the temperature of water W to be heated at the water supply inlet 21h of the heat transfer tube 2 (inlet temperature Ti). In the example shown in FIG. 6, the flow-passage switching part 63 includes two solenoid valves (solenoid valve 62 and solenoid valve 64), and the opening degrees of the solenoid valve 62 and the solenoid valve 64 are controlled in accordance with an order from the flow-passage switching part 32. That is, the flow-passage switching part 32 opens the solenoid valve 64 so that water W to be heated passes through the pre-heating route Rh passing through the pre-heating tube 81, if the inlet temperature Ti of water W to be heated detected by the inlet temperature sensor 52 is not higher than a predetermined temperature. At the same time, the solenoid valve 62 may be fully closed so that water W to be heated does not flow to the direct route Rd. Accordingly, the pre-heated water W to be heated is supplied from the water supply inlet 21h. In contrast, the flow-passage switching part 32 closes the solenoid valve 64 so that water W to be heated does not pass through the pre-heating route Rh, if the inlet temperature Ti of water W to be heated is not higher than a predetermined temperature. Accordingly, water W to be heated that is not pre-heated is supplied from the water supply inlet 21h to the heat transfer tube 2. The predetermined temperature is determined depending on the target increasing temperature (condensate temperature) of water W to be heated, the target position of the condensate region Pc (position of specific region) in the heat transfer tube 2, or the thermal transmission area of the heat transfer tube 2. For instance, the predetermined temperature may be a temperature within the range of from 10 to 30 degrees (° C.). Furthermore, the outlet for water W to be heated from the pre-heating tube 81 may be coupled to the water supply passage 9 outside the duct 4, and for instance, may be coupled between the solenoid valve 62 and the solenoid valve 64. Furthermore, the solenoid valve 64 controlling an inflow of water W to be heated to the pre-heating route Rh may be disposed inside the duct 4, and for instance, may be positioned between the pre-heating tube 81 and the heat transfer tube 2.

With this configuration, the temperature of exhaust gas E when passing through the pre-heating tube 81 along the duct 4 is still higher than the temperature of water W to be heated before being heated by the heating unit 8. Thus, water W to be heated before being supplied to the heat transfer tube 2 from the water supply inlet 21h can be pre-heated (heated)

through heat exchange between water W to be heated passing through the pre-heating tube 81 and exhaust gas E. Thus, if the temperature of water W to be heated is not higher than the predetermined temperature, water W to be heated is supplied to the heat transfer tube 2 after pre-heating, and thereby it is possible to prevent wide fluctuations of the position of the condensate region Pc in the heat transfer tube 2. In particular, even when the temperature of water W to be heated supplied from the water supply inlet 21h changes depending on season, it is possible to prevent fluctuation of the condensate region Pc formed in the heat transfer tube 2.

With the above configuration, water W to be heated is pre-heated if the temperature of water W to be heated supplied from the water supply inlet 21h is not higher than a predetermined temperature. Accordingly, it is possible to suppress fluctuation of the boundary between the dry region Pd and the condensate region Pc (wet region Pw) that occurs in the heat transfer tube 2, and thus it is possible to limit the range in which the dry-wet alternation region Pr is formed in the heat transfer tube.

Furthermore, in some embodiments, as shown in FIGS. 7A to 8B, the duct 4 includes the first duct 45 forming a bypassed passage Rm and the second duct 46 forming a bypass passage Rb bypassing the bypassed passage Rm. The latent-heat recovery device 1 further includes a damper 47 for switching between the bypassed passage Rm and the bypass passage Rb, and the heat transfer tube 2 is disposed in the bypass passage Rb. In the embodiment shown in FIGS. 7A to 8B, the first duct 45 is formed so as to extend linearly in the horizontal direction. Furthermore, an opening 45h (an upper surface of the first duct 45 in the example shown in FIG. 7) is disposed on a part of the first duct 45.

On the other hand, in the embodiment shown in FIGS. 7A and 7B, the second duct 46 has a box shape with a surface open (opening 46h). The first duct 45 and the second duct 46 are coupled through the opening 45h of the first duct 45 and the opening 46h of the second duct 46. Thus, a space is formed by the interior of the second duct 46, above the first duct having a linear shape. Further, a damper 47 having a plate shape partially separates the interior space of the second duct 46. Accordingly, the second duct 46 forms the bypass passage Rb capable of bringing both sides of a section (bypassed passage Rm) of the duct 4 formed by the first duct 45 into communication, without passing the section. That is, the bypass passage Rb is formed by a left passage formed by the second duct 46 and the left surface of the damper 47, and a right passage formed by the second duct 46 and the right surface of the damper 47. The damper 47 is disposed so as to be capable of switching between the bypassed passage Rm and the bypass passage Rb.

Specifically, in the example shown in FIGS. 7A and 7B, the center of the damper 47 having a plate shape is disposed on the boundary between the first duct 45 and the second duct 46, and the damper 47 is configured to be rotatable about the center of the damper 47 being the rotational center O. Furthermore, as shown in FIG. 7A, when the damper 47 is rotated about the rotational center O and fixed to such a position that the damper 47 closes the bypassed passage Rm, exhaust gas E flows through the bypass passage Rb. At this time, the exhaust gas E flowing from the first duct 45 into the second duct 46 ascends through the left passage of the bypass passage Rb, and descends the right passage, then flowing downstream of the damper 47 of the first duct 45. In contrast, as shown in FIG. 7B, when the damper 47 is fixed to such a position that the damper 47 closes the opening 45h of the first duct 45 (the opening 46h of the second duct 46), exhaust gas E flows downstream through the bypassed passage Rm without flowing into the second duct 46. As described above, the flow passage can be switched easily by rotating the damper 47, and the passage can be switched easily while a combustion device such as a boiler is in operation.

Figure 8A:
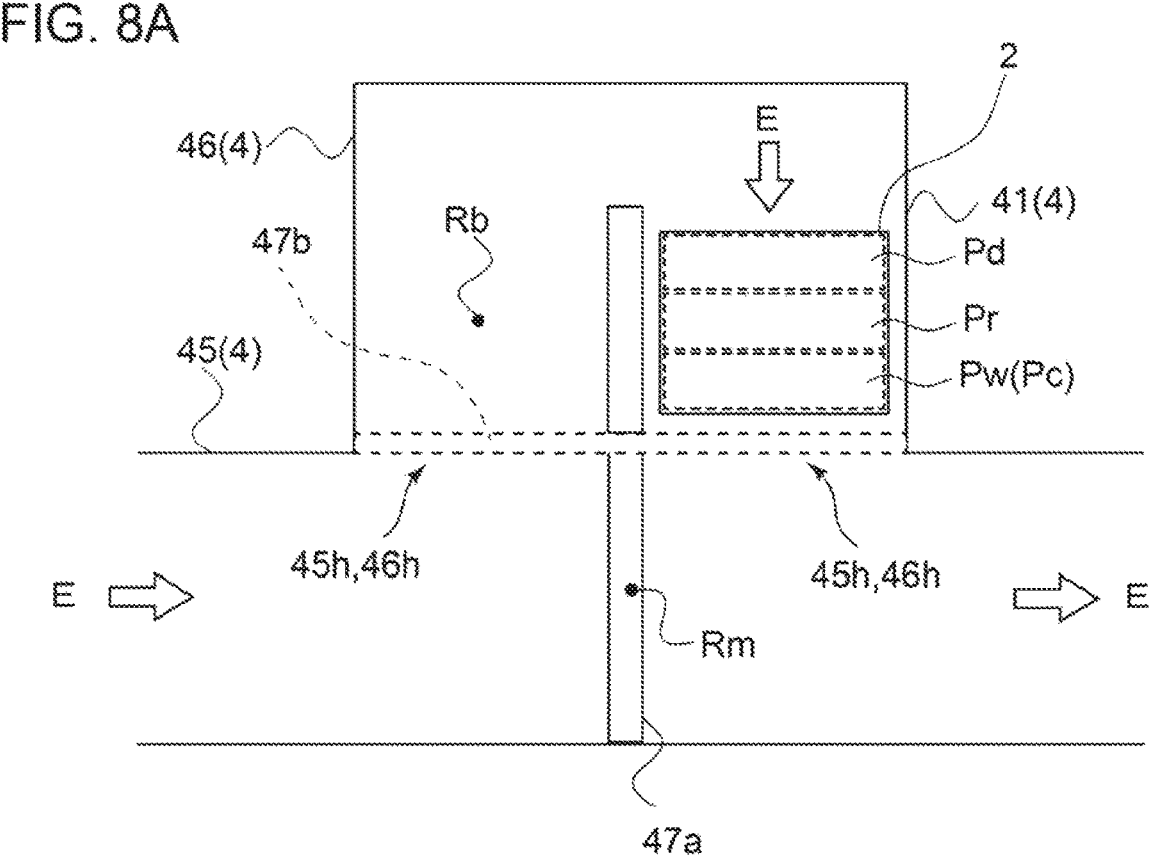
FIG. 8A is a diagram of a latent-heat recovery device installed in a duct including a bypass passage according to another embodiment of the present invention, showing a state in which exhaust gas passes through the bypass passage.
Figure 8B:
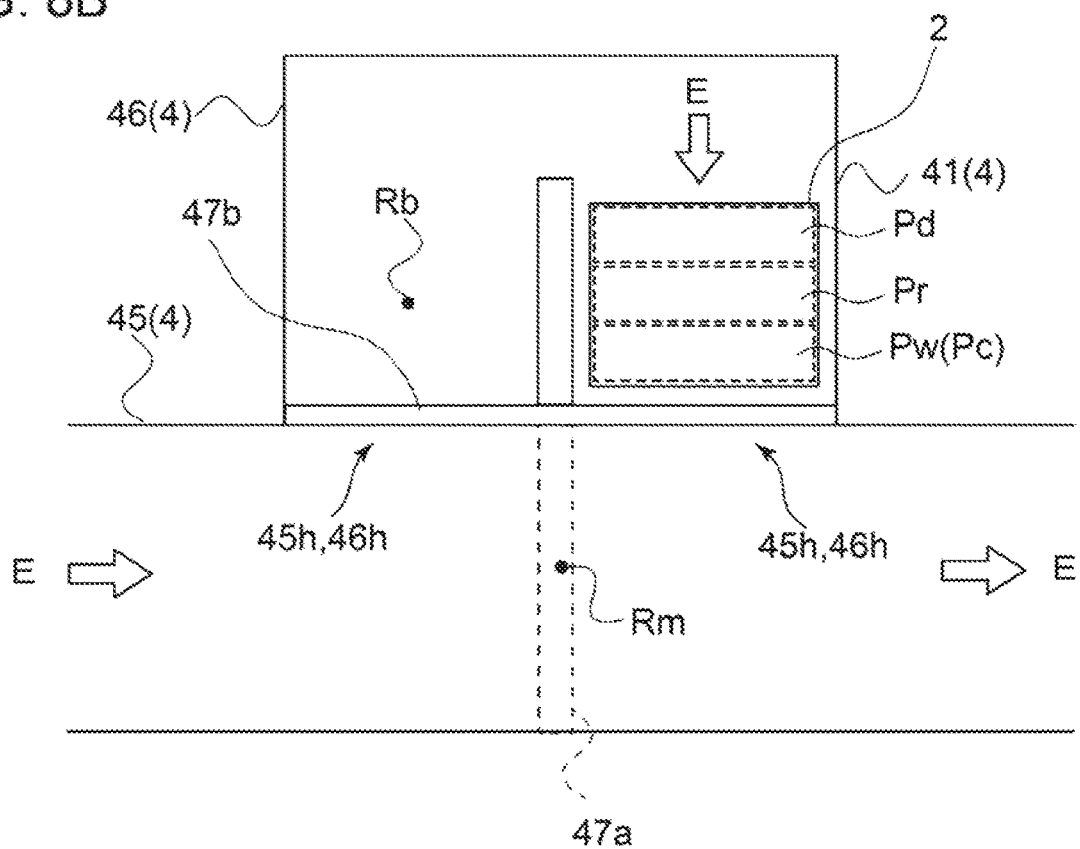
FIG. 8B is a diagram of a latent-heat recovery device installed in a duct including a bypass passage according to another embodiment of the present invention, for describing a state in which exhaust gas passes through a bypassed passage.

Furthermore, the damper 47 may comprise a plurality of dampers, and for instance, in some other embodiments, as shown in FIGS. 8A and 8B, the damper 47 may comprise the first damper 47a and the second damper 47b. Specifically, the first damper 47a is for permitting or forbidding exhaust gas E to pass through a part of the first duct 45 (bypassed passage Rm) further downstream the duct 4, and is disposed so that exhaust gas E does not pass through at least a part of the bypassed passage Rm. Furthermore, the second damper 47b is for permitting or forbidding exhaust gas E to pass through the second duct 46 (bypass passage Rb) further downstream the bypassed passage Rm.

Specifically, in the example shown in FIGS. 8A to 8B, two openings 45h are disposed on different portions of the first duct 45, and the openings 46h (inlet and outlet) of both ends of the second duct 46 are coupled to the two respective openings 45h of the first duct 45. Furthermore, the second damper 47b is configured to be capable of covering both of the inlet and the outlet of the second duct 46. As shown in FIG. 8A, when the first damper 47a closes the bypassed passage Rm, and the second damper 47b does not close both ends of the second duct 46, exhaust gas E flows through the bypass passage Rb. In contrast, as shown in FIG. 8B, when the first damper 47a does not close the bypassed passage Rm, and the second damper 47b closes both ends of the second duct 46, exhaust gas E flows downstream through the bypassed passage Rm without flowing into the second duct 46 (bypass flow path Rb). Accordingly, the size of the duct 4 and the damper 47 can be adjusted easily, and the damper 47 can be easily installed. Furthermore, in some other embodiments, the second damper 47b may not necessarily close the inlet and the outlet of the second duct 46 at the same time. For instance, the second damper 47b may be disposed inside the second duct 46 except for both ends, and may be disposed on at least one of the upstream side or the downstream side at which the heat transfer tube 2 is disposed, in the second duct 46 (bypass passage Rb). The first damper 47a and the second damper 47b may rotate about their center or end as a rotational center, or may be moved by sliding at least partially to the outside of the duct 4, to open or close the passage.

In the latent-heat recovery device 1 having the above configuration, the damper 47 opens the bypass passage Rb and closes the bypassed passage Rm, during operation. Thus, the exhaust gas E passes through the bypass passage Rb without passing through the bypassed passage Rm, and thus latent heat of exhaust gas E is recovered by the latent-heat recovery device 1. Furthermore, during maintenance, the damper 47 closes the bypass passage Rb and opens the bypassed passage Rm. Thus, the exhaust gas E passes through the bypassed passage Rm without passing through the bypass passage Rb, and exhaust gas E does not pass through the latent-heat recovery device 1. Thus, it is possible to perform maintenance on the latent-heat recovery device 1 during operation in which a combustion device such as a boiler is operated.

With the above configuration, with the damper 47, exhaust gas E flowing through the duct 4 can pass through at least one of the bypassed passage Rm formed in the first duct 4 or the bypass passage Rb formed in the second duct 46. Thus, at maintenance such as check and replacement of the heat transfer tube 2, the passage is switched so that exhaust gas E flows through the bypassed passage Rm, and thereby it is possible to perform maintenance without stopping a combustion device such as a boiler.

Further, in some embodiments, the water supply inlet 21h and the water supply outlet 22h are coupled to the header 91, and the flexible tube 92 couples the header 91 and at least one of the water supply inlet 21h or the water supply outlet 22h. Steam generated by a combustion device such as a boiler is sent to the header 91, and is distributed from the header 91 to the heat transfer tube 2 (latent-heat recovery device 1). Furthermore, water W to be heated from the heat transfer tube 2 is also sent to the header 91, and is sent to devices such as a combustion device like a boiler and a water heater. The flexible tube 92 is a tube that can warp, and is formed of metal, rubber, or the like. The flexible tube 92 couples the header 91 and the heat transfer tube 2. Accordingly, with the flexible tube 92, it is possible to provide the coupling with the header 91 easily, and to perform plug work (closure) easily in emergency.

Embodiments of the present invention were described in detail above, but the present invention is not limited thereto, and various amendments and modifications may be implemented.

DESCRIPTION OF REFERENCE NUMERALS

1 Latent-heat recovery device (condensate economizer)
2 Heat transfer tube
21 Inlet-side end portion
21h Water supply inlet
22 Outlet-side end portion
22h Water supply outlet
23 Middle section
24 Linear tube section
24i Linear tube section closest to water supply inlet
24o Linear tube section closest to water supply outlet
25 Curved tube section
26 Conjunction tube section
26a Coupling tube section having a linear shape
26i Conjunction tube section with water supply inlet
26o Conjunction tube section with water supply outlet
27 Heat transfer tube module
27a First heat transfer tube module
27b Second heat transfer tube module
27u Upstream end portion
27d Downstream end portion
28 Union
3 Electronic control device
31 Water supply control part
32 Flow-passage switching part
4 Duct
41 Descending section
42 Horizontal section
44 Drain discharge outlet
45 First duct (bypassed passage)
45h Opening of first duct
46 Second duct
46h Opening of second duct
47 Damper
5 Outlet temperature sensor
52 Inlet temperature sensor
6 Water supply unit
61 Flow-rate control unit
62 Solenoid valve
63 Flow-passage switching part
64 Solenoid valve
7 Tube sheet
8 Heating unit
81 Pre-heating tube
9 Water supply passage
91 Header
92 Flexible tube
E Exhaust gas
W Water to be heated
Wc Condensate water
To Outlet temperature
Ti Inlet temperature
Tc Set temperature
Pc Condensate region
Pd Dry region
Pr Dry-wet alternation region
Pw Wet region
Rd Direct route
Rh Pre-heating route
Rm Bypassed passage
Rb Bypass passage
O Rotational center of damper

The invention claimed is:

1. A condensate economizer, comprising:
a heat transfer tube disposed inside a duct through which exhaust gas flows, the heat transfer tube having a water supply inlet into which water to be heated for recovering latent heat of the exhaust gas is supplied and a water supply outlet through which the water to be heated is discharged;
a water supply control part configured to control supply of the water to be heated to the water supply inlet; and
a temperature sensor configured to detect an outlet temperature being a temperature of the water to be heated at the water supply outlet,
wherein the water supply control part is configured to control supply of the water to be heated from the water supply inlet so that the outlet temperature is at a set temperature,
wherein the heat transfer tube is disposed inside the duct so that the water supply inlet is positioned on a downstream side of the duct and the water supply outlet is positioned on an upstream side of the duct,
wherein the heat transfer tube has a condensate region in which water vapor contained in the exhaust gas condenses, a dry region which is passed by the exhaust gas before reaching a condensate temperature upstream of the condensate region, and a dry-wet alteration region which is between the dry region and the condensate region,
wherein the set temperature is determined so that the condensate temperature of the exhaust gas and the condensate region are formed in a specific region of a middle section of the heat transfer tube, disposed between the water supply inlet and the water supply outlet, limiting the range in which the dry-wet alternation region is formed in the heat transfer tube.

2. The condensate economizer according to claim 1, wherein the water supply control part is configured to control a flow rate of the water to be heated supplied to the water supply inlet.

3. The condensate economizer according to claim 1, wherein the heat transfer tube includes:
linear tube sections extending linearly in a direction orthogonal to a flow passage formed by the duct; and
a curved tube section coupling end portions of two of the linear tube sections with each other, wherein the middle section comprises at least one heat transfer tube module comprising a predetermined number of the linear tube sections, the predetermined number being two or more, and at least one of the curved tube section coupling the linear tube sections arranged along the flow passage, and wherein a tube coupling is disposed on each of both end portions of the heat transfer tube module.

4. The condensate economizer according to claim 1, wherein the heat transfer tube includes:
   linear tube sections extending linearly in a direction orthogonal to a flow passage formed by the duct; and
   a curved tube section coupling end portions of two of the linear tube sections with each other,
   wherein the middle section includes at least one of the linear tube sections, and
   wherein the linear tube sections and the curved tube section are coupled by a tube coupling in the middle section.

5. The condensate economizer according to claim 1, wherein the heat transfer tube includes:
   linear tube sections extending linearly in a direction orthogonal to a flow passage formed by the duct; and
   a curved tube section coupling end portions of two or more of the linear tube sections,
   wherein the latent-heat recovery device further comprises a tube sheet configured to fix end portions of the linear tube portions on each of both ends of the linear tube sections, and
   wherein the middle section includes at least one of the linear tube sections.

6. The condensate economizer according to claim 1, further comprising a heating unit for pre-heating the water to be heated,
   wherein the water supply control part is configured to, if a temperature of the water to be heated is not higher than a predetermined temperature, supply the water to be heated which is pre-heated by the heating unit to the water supply inlet.

7. The condensate economizer according to claim 1, wherein the duct includes:
   a first duct forming a bypassed passage; and
   a second duct forming a bypass passage bypassing the bypassed passage,
   wherein the latent-heat recovery device further comprises a damper for switching the bypassed passage and the bypass passage, and
   wherein the heat transfer tube is disposed in the bypass passage.

8. The condensate economizer according to claim 1, wherein the water supply inlet and the water supply outlet are coupled to a header, and
   wherein the header and at least one of the water supply inlet or the water supply outlet is coupled to each other via a flexible tube.

9. The condensate economizer according to claim 1, wherein the exhaust gas is exhaust gas discharged from a boiler.

10. The condensate economizer according to claim 1, wherein the duct includes a descending section formed so as to guide the exhaust gas from above toward a bottom, and a horizontal section coupled to the downstream side of the descending section and formed so as to guide the exhaust gas in the horizontal direction, and
    wherein the heat transfer tube is disposed inside the descending section or the horizontal section.

11. A condensate economizer, comprising:
    a heat transfer tube disposed inside a duct through which exhaust gas flows, the heat transfer tube having a water supply inlet into which water to be heated for recovering latent heat of the exhaust gas is supplied and a water supply outlet through which the water to be heated is discharged;
    a water supply control part configured to control supply of the water to be heated to the water supply inlet; and
    a temperature sensor configured to detect an outlet temperature being a temperature of the water to be heated at the water supply outlet,
    wherein the water supply control part is configured to control supply of the water to be heated from the water supply inlet so that the outlet temperature is at a set temperature,
    wherein the heat transfer tube is disposed inside the duct so that the water supply inlet is positioned on a downstream side of the duct and the water supply outlet is positioned on an upstream side of the duct,
    wherein the set temperature is determined so that a condensate temperature of the exhaust gas is formed in a specific region of a middle section of the heat transfer tube disposed between the water supply inlet and the water supply outlet, wherein the heat transfer tube has a condensate region in which water vapor contained in the exhaust gas condenses; a dry region which is passed by the exhaust gas before reaching the condensate temperature upstream of the condensate region; and a dry-wet alteration region which is between the dry region and the condensate region, wherein the condensate region is formed in the specific region,
    wherein the duct includes:
    a first duct forming a bypassed passage; and
    a second duct forming a bypass passage bypassing the bypassed passage,
    wherein the latent-heat recovery device further comprises a damper for switching the bypassed passage and the bypass passage,
    wherein the heat transfer tube is disposed only in the bypass passage, and
    wherein a flow of the exhaust gas through the duct is configured to be switched so as to pass through either one of the bypassed passage formed in the first duct or the bypass passage formed in the second duct by the damper.

* * * * *